US012707503B2

(12) United States Patent
Cheng et al.

(10) Patent No.: US 12,707,503 B2
(45) Date of Patent: Aug. 11, 2026

(54) SERVICE GROUPS FOR RANDOM ACCESS

(71) Applicant: QUALCOMM Incorporated, San Diego, CA (US)

(72) Inventors: Peng Cheng, Beijing (CN); Linhai He, San Diego, CA (US); Ravi Agarwal, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 514 days.

(21) Appl. No.: 18/043,922

(22) PCT Filed: Oct. 30, 2020

(86) PCT No.: PCT/CN2020/125184
§ 371 (c)(1),
(2) Date: Mar. 3, 2023

(87) PCT Pub. No.: WO2022/088024
PCT Pub. Date: May 5, 2022

(65) Prior Publication Data

US 2023/0328794 A1 Oct. 12, 2023

(51) Int. Cl.
*H04W 74/0833* (2024.01)
*H04W 74/00* (2009.01)
(Continued)

(52) U.S. Cl.
CPC ..... *H04W 74/0833* (2013.01); *H04W 74/006* (2013.01); *H04W 74/0836* (2024.01); *H04W 74/0838* (2024.01)

(58) Field of Classification Search
CPC ........... H04W 74/0833; H04W 74/006; H04W 48/18; H04W 74/0836; H04W 74/0838; Y02D 30/70
See application file for complete search history.

(56) References Cited

U.S. PATENT DOCUMENTS

2017/0367120 A1 12/2017 Murray
2018/0192445 A1 7/2018 Jiang
(Continued)

FOREIGN PATENT DOCUMENTS

CN 108633050 A 10/2018
CN 108633101 A 10/2018
(Continued)

OTHER PUBLICATIONS

Machine Translation of CN 110445592 A (Year: 2012).*
(Continued)

*Primary Examiner* — Khaled M Kassim
*Assistant Examiner* — Noah James Sugden
(74) *Attorney, Agent, or Firm* — Loza & Loza LLP

(57) ABSTRACT

Aspects relate to random access procedures. Different random access channel (RACH) configurations may be defined for different service groups. For example, one or more service groups (e.g., network slice groups) may be defined where each service group includes one or more services (network slices). One RACH configuration may be defined for one service group, another RACH configuration may be defined for another service group, and so on. Each service group may be configured with a different set of RACH parameters. Within each service group, one or more services may be configured with dedicated (e.g., non-cell-specific) RACH resources, and other services may be configured with cell-specific RACH resources. Each service group may be configured with different RACH resources. Within each service group, one or more services may be configured with
(Continued)

a set of dedicated (e.g., non-cell-specific) RACH parameters, and other services may be configured with a set of cell-specific RACH resources.

23 Claims, 13 Drawing Sheets

(51) Int. Cl.
*H04W 74/0836* (2024.01)
*H04W 74/0838* (2024.01)

(56) References Cited

U.S. PATENT DOCUMENTS

| | | | | |
|---|---|---|---|---|
| 2020/0068621 | A1* | 2/2020 | Islam | H04W 74/0833 |
| 2022/0353804 | A1* | 11/2022 | Fu | H04W 74/0841 |

FOREIGN PATENT DOCUMENTS

| | | | | | |
|---|---|---|---|---|---|
| CN | 110445592 A | * | 11/2019 | | H04W 72/541 |
| CN | 110574480 A | | 12/2019 | | |
| CN | 115836578 A | * | 3/2023 | | H04W 74/0833 |
| EP | 3641433 A1 | | 4/2020 | | |

OTHER PUBLICATIONS

Machine Translation of CN 115836578 A (Year: 2021).*

Huawei, et al., "Slice Based RACH Configuration or Access Barring", R2-2010182, 3GPP TSG-RAN WG2 Meeting #112 electronic, Oct. 23, 2020 (Oct. 23, 2020), 2 Pages, see the whole document.

International Search Report and Written Opinion—PCT/CN2020/125184—ISA/EPO—Aug. 5, 2021.

Vivo: "Remaining Issues on RACH and Service Continuity", R2-2009688, 3GPP TSG-RAN WG2 Meeting #112 e, Oct. 23, 2020 (Oct. 23, 2020), 3 Pages, see the whole document.

Zte Corporation, et al., "Consideration on the Slice Specific RACH Configuration", R2-2009806, 3GPP TSG-RAN WG2 Meeting#112, Nov. 2-13, 2020, Oct. 22, 2020 (Oct. 22, 2020), 4 Pages, see section 2.1, figure 2, pp. 2-3.

Interdigital Communications: "PRACH Resources for NR", 3GPP TSG-RAN WG2 Meeting #97bis, R2-1702870 ( R15 NR WI A110314 Prach Partitioning), 3rd Generation Partnership Project, Mobile Competence Centre, 650, Route Des Lucioles, F-06921 Sophia-Antipolis Cedex, France, vol. RAN WG2, No. Spokane, USA, Apr. 3, 2017-Apr. 7, 2017, Mar. 25, 2017, pp. 1-2, XP051254309, paragraph [02.11].

Supplementary European Search Report—EP20959186—Search Authority—The Hague—Jun. 11, 2024.

* cited by examiner

SERVICE GROUPS FOR RANDOM ACCESS

CROSS-REFERENCE TO RELATED APPLICATION(S)

This application is the U.S. national stage of PCT patent application number PCT/CN2020/125184 filed on Oct. 30, 2020.

TECHNICAL FIELD

The technology discussed below relates generally to wireless communication and, more particularly, to service group-based configurations for transmission of a random access message.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) for different UEs operating within a cell of the base station. A UE may initiate a random access procedure to initially gain access to a cell. If the random access procedure is successful, the UE may connect to the cell for subsequent scheduling by the base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to random access procedures. In some examples, different random access channel (RACH) configurations may be defined for different service groups. For example, one or more service groups (e.g., network slice groups) may be defined where each service group includes one or more services (network slices). In addition, one RACH configuration may be defined for one service group, another RACH configuration may be defined for another service group, and so on.

In some examples, each service group may be configured with a different set of RACH parameters. In addition, within each service group, one or more services may be configured with dedicated (e.g., non-cell-specific) RACH resources, and other services may be configured with cell-specific RACH resources.

In some examples, each service group may be configured with different RACH resources. In addition, within each service group, one or more services may be configured with a set of dedicated (e.g., non-cell-specific) RACH parameters, and other services may be configured with a set of cell-specific RACH resources.

In some examples, a method for wireless communication at a user equipment may include identifying a service, selecting a first random access channel (RACH) configuration for the service from a set of RACH configurations for a plurality of groups of services, and conducting a RACH operation for the service according to the first RACH configuration.

In some examples, a user equipment may include a transceiver, a memory, and a processor communicatively coupled to the transceiver and the memory. The processor and the memory may be configured to identify a service, select a first random access channel (RACH) configuration for the service from a set of RACH configurations for a plurality of groups of services, and conduct a RACH operation for the service via the transceiver according to the first RACH configuration.

In some examples, a user equipment may include means for identifying a service, means for selecting a first random access channel (RACH) configuration for the service from a set of RACH configurations for a plurality of groups of services, and means for conducting a RACH operation for the service according to the first RACH configuration.

In some examples, an article of manufacture for use by a user equipment includes a computer-readable medium having stored therein instructions executable by one or more processors of the user equipment to identify a service, select a first random access channel (RACH) configuration for the service from a set of RACH configurations for a plurality of groups of services, and conduct a RACH operation for the service according to the first RACH configuration.

One or more of the following features may be applicable to one or more of the method, the apparatuses, and the computer-readable medium of the preceding paragraphs. The plurality of groups of services may be a plurality of groups of network slices. The first RACH configuration may specify a RACH resource for the RACH operation and/or a RACH parameter for the RACH operation. The RACH parameter may be a preamble ramping step and/or a backoff scaling factor. The RACH resource may be a group of preambles and/or a RACH occasion (RO). The RACH configuration and the RACH operation may be for a 4-step RACH and/or a 2-step RACH. An indication of the set of RACH configurations may be received from a base station via a radio resource control (RRC) message, a system information block (SIB), or a non-access stratum (NAS) message. The set of RACH configurations may specify the first RACH configuration for a first slice group and a second RACH configuration for a second slice group that is different from the first slice group.

In some examples, a method for wireless communication at a base station may include defining a set of RACH configurations for a plurality of groups of services, transmitting an indication of the set of RACH configurations, and receiving a RACH message according to a first RACH configuration of the set of RACH configurations. The RACH message may be for at least one service of a first group of the plurality of groups of services.

In some examples, a base station may include a transceiver, a memory, and a processor communicatively coupled to the transceiver and the memory. The processor and the memory may be configured to define a set of RACH configurations for a plurality of groups of services, transmit an indication of the set of RACH configurations via the transceiver, and receive a RACH message according to a first RACH configuration of the set of RACH configurations via the transceiver. The RACH message may be for at least one service of a first group of the plurality of groups of services.

In some examples, a base station may include means for defining a set of RACH configurations for a plurality of groups of services, means for transmitting an indication of the set of RACH configurations, and means for receiving a RACH message according to a first RACH configuration of the set of RACH configurations. The RACH message may be for at least one service of a first group of the plurality of groups of services.

In some examples, an article of manufacture for use by a base station includes a computer-readable medium having stored therein instructions executable by one or more processors of the base station to define a set of RACH configurations for a plurality of groups of services, transmit an indication of the set of RACH configurations, and receive a RACH message according to a first RACH configuration of the set of RACH configurations. The RACH message may be for at least one service of a first group of the plurality of groups of services.

One or more of the following features may be applicable to one or more of the method, the apparatuses, and the computer-readable medium of the preceding paragraphs. The plurality of groups of services may be a plurality of groups of network slices. The first RACH configuration may specify a RACH resource for the RACH operation and/or a RACH parameter for the RACH operation. The RACH parameter may be a preamble ramping step and/or a backoff scaling factor. The RACH resource may be a group of preambles and/or a RACH occasion (RO). The RACH configuration and the RACH operation may be for a 4-step RACH and/or a 2-step RACH. The indication of the set of RACH configurations may be transmitted to a UE via a radio resource control (RRC) message, a system information block (SIB), or a non-access stratum (NAS) message. The set of RACH configurations may specify the first RACH configuration for a first slice group and a second RACH configuration for a second slice group that is different from the first slice group.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
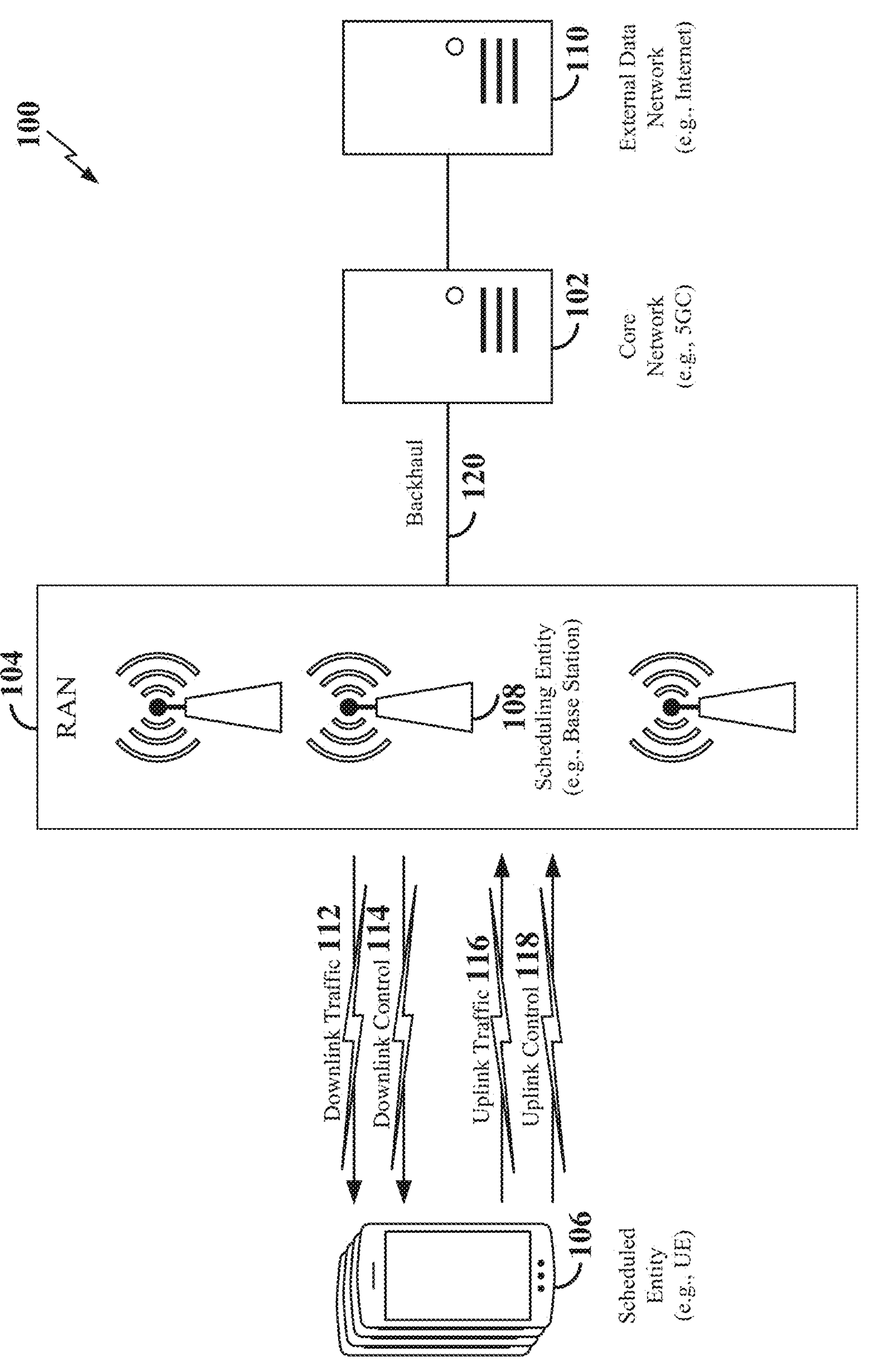
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be co-located or non-co-located. The TRPs may communicate on the same carrier frequency or different carrier frequencies within the same frequency band or different frequency bands.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a “mobile” apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an “Internet of Things” (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a scheduling entity (described further below, e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a scheduled entity (described further below, e.g., UE 106).

In some examples, access to the air interface may be scheduled, wherein a scheduling entity (e.g., a base station 108) allocates resources for communication among some or all devices and equipment within its service area or cell.

Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
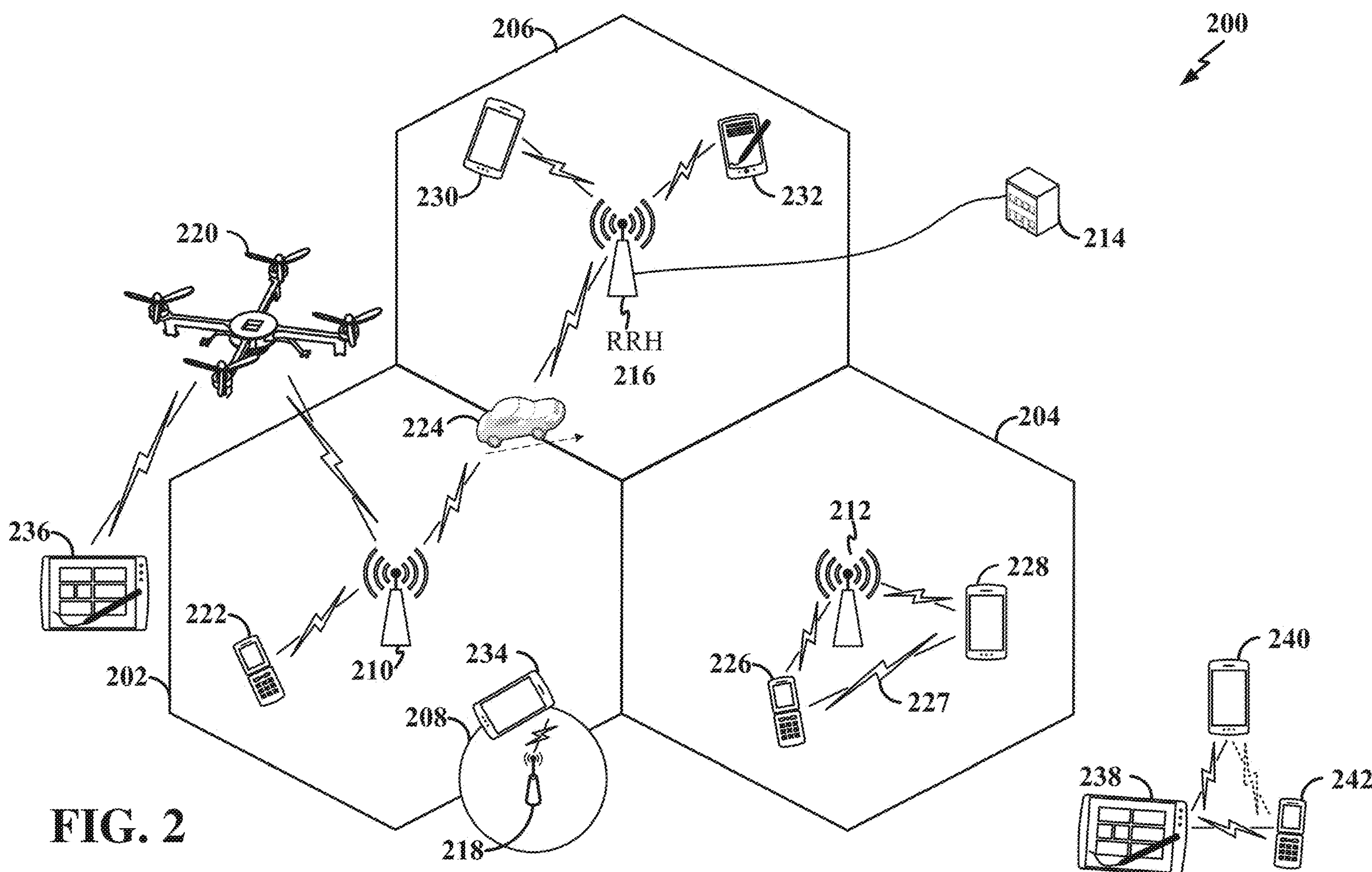
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204, and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIG. 1) for all the UEs in the respective cells. For example, UEs 222 and 224 may be in communication with base station 210, UEs 226 and 228 may be in communication with base station 212, UEs 230 and 232 may be in communication with base station 214 by way of RRH 216, and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210. In some examples, a UAV 220 may be configured to function as a BS (e.g., serving a UE 236). That is, in some examples, a cell may not necessarily be stationary, and the geographic area of the cell may move according to the location of a mobile base station such as a UAV 220.

In the radio access network 200, the ability for a UE to communicate while moving, independent of its location, is referred to as mobility. The various physical channels between the UE and the radio access network are generally set up, maintained, and released under the control of an access and mobility management function (AMF). The AMF (not shown in FIG. 2) may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the UE 238 (e.g., functioning as a scheduling entity). Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g., a physical sidelink shared channel) and sidelink control (e.g., a physical sidelink control channel).

In some examples, two or more UEs (e.g., UEs 226 and 228) within the coverage area of a serving base station 212 may communicate with both the base station 212 using cellular signals and with each other using direct link signals (e.g., sidelink signals 227) without relaying that communication through the base station. In an example of a V2X network within the coverage area of the base station 212, the base station 212 and/or one or both of the UEs 226 and 228 may function as scheduling entities to schedule sidelink communication between UEs 226 and 228.

Figure 3:
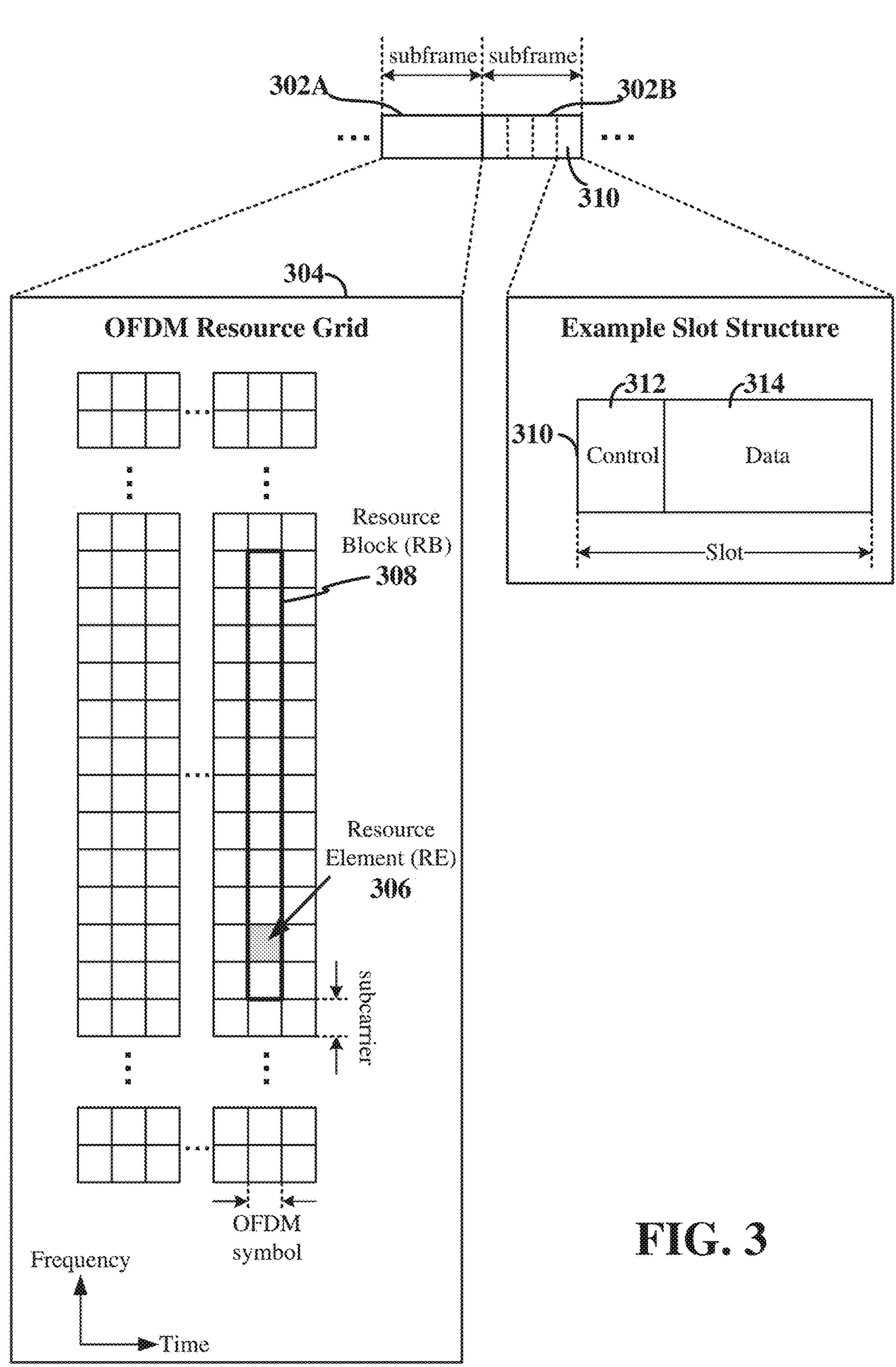
FIG. 3 is a schematic illustration of an example of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example DL subframe (SF) 302A is illustrated, showing an OFDM resource grid 304. However, as those skilled in the art will readily appreciate, the physical layer (PHY) transmission structure for any particular application may vary from the example described here, depending on any number of factors. Here, time is in the horizontal direction with units of OFDM symbols, and frequency is in the vertical direction with units of subcarriers. 5G NR supports a scalable numerology where different numerologies may be used for different radio frequency spectrums, different bandwidths, and the like. For example, sub-carrier spacings (SCSs) of 15 kHz, 30 kHz, 60 kHz, etc., may be used in different scenarios.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink, uplink, or sidelink transmissions typically involves scheduling one or more resource elements 306 within one or more sub-bands or bandwidth parts (BWPs). Each BWP may include two or more contiguous or consecutive RBs. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, RSU, etc.) or may be self-scheduled by a UE implementing D2D sidelink communication.

In this illustration, the RB 308 is shown as occupying less than the entire bandwidth of the subframe 302A, with some subcarriers illustrated above and below the RB 308. In a given implementation, the subframe 302A may have a bandwidth corresponding to any number of one or more RBs 308. Further, in this illustration, the RB 308 is shown as occupying less than the entire duration of the subframe 302A, although this is merely one possible example.

Each 1 ms subframe 302A may consist of one or multiple adjacent slots. In the example shown in FIG. 3, one subframe 302B includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, a slot 310 may be utilized for broadcast or unicast communication. In V2X or D2D networks, a broadcast communication may refer to a point-to-multipoint transmission by a one device (e.g., a vehicle, base station (e.g., RSU, gNB, eNB, etc.), UE, or other similar device) to other devices. A unicast communication may refer to a point-to-point transmission by a one device to a single other device.

In an example, the control region 312 of the slot 310 may include a physical downlink control channel (PDCCH) including downlink control information (DCI) transmitted by a base station (e.g., gNB, eNB, RSU, etc.) towards one or more of a set of UEs, which may include one or more sidelink devices (e.g., V2X/D2D devices). In some examples, the DCI may include synchronization information to synchronize communication by a plurality of sidelink devices on the sidelink channel. In addition, the DCI may include scheduling information indicating one or more resource blocks within the control region 312 and/or data region 314 allocated to sidelink devices for sidelink communication. For example, the control region 312 of the slot may further include control information transmitted by sidelink devices over the sidelink channel, while the data region 314 of the slot 310 may include data transmitted by sidelink devices over the sidelink channel. In some examples, the control information may be transmitted within a physical sidelink control channel (PSCCH), while the data may be transmitted within a physical sidelink shared channel (PSSCH).

In a DL transmission (e.g., over the Uu interface), the transmitting device (e.g., the scheduling entity) may allocate one or more REs 306 (e.g., within a control region 312) to carry DL control information including one or more DL control channels, such as a PBCH, and/or a physical downlink control channel (PDCCH), etc., to one or more scheduled entities. The transmitting device may further allocate one or more REs 306 to carry other DL signals, such as a DMRS, a phase-tracking reference signal (PT-RS), a channel state information-reference signal (CSI-RS), a primary synchronization signal (PSS), and a secondary synchronization signal (SSS).

The synchronization signals PSS and SSS, and in some examples, the PBCH and a PBCH DMRS, may be transmitted in a synchronization signal block (SSB) that includes 3 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals, may include one or more supplemental channels in addition to the PBCH, may omit a PBCH, and/or may utilize a different number of symbols and/or nonconsecutive symbols for an SSB, within the scope of the present disclosure.

The SSB may be used to send system information (SI) and/or provide a reference to SI transmitted via another channel. Examples of system information may include, but are not limited to, subcarrier spacing, system frame number, a cell global identifier (CGI), a cell bar indication, a list of common control resource sets (coresets), a list of common search spaces, a search space for system information block 1 (SIB1), a paging search space, a random access search space, and uplink configuration information. Two specific examples of coresets include PDCCH CORESET 0 and CORESET 1.

The SI may be subdivided into three sets referred to as minimum SI (MSI), remaining MSI (RMSI), and other SI (OSI). The PBCH may carry the MSI and some of the RMSI. For example, the PBCH may carry a master information block (MIB) that includes various types of system information, along with parameters for decoding a system information block (SIB). In some examples, the MIB may configure CORESET0.

The RMSI may be carried by, for example, a SystemInformationType1 (SIB1). A base station may transmit SIB1 (and, hence, RMSI) on a PDSCH. The CORESET0 contains the scheduling information for the PDSCH carrying the SIB1.

The PDCCH may carry downlink control information (DCI) including but not limited to power control commands, scheduling information, a grant, and/or an assignment of REs for DL and UL transmissions. The PHY carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission (e.g., over the Uu interface), the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., a request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH, or for an UL transmission, a physical uplink shared channel (PUSCH). In some examples, one or more REs 306 within the data region 314 may be configured to carry SIBs (e.g., SIB1), carrying system information that may enable access to a given cell.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figures 4A, 4B:
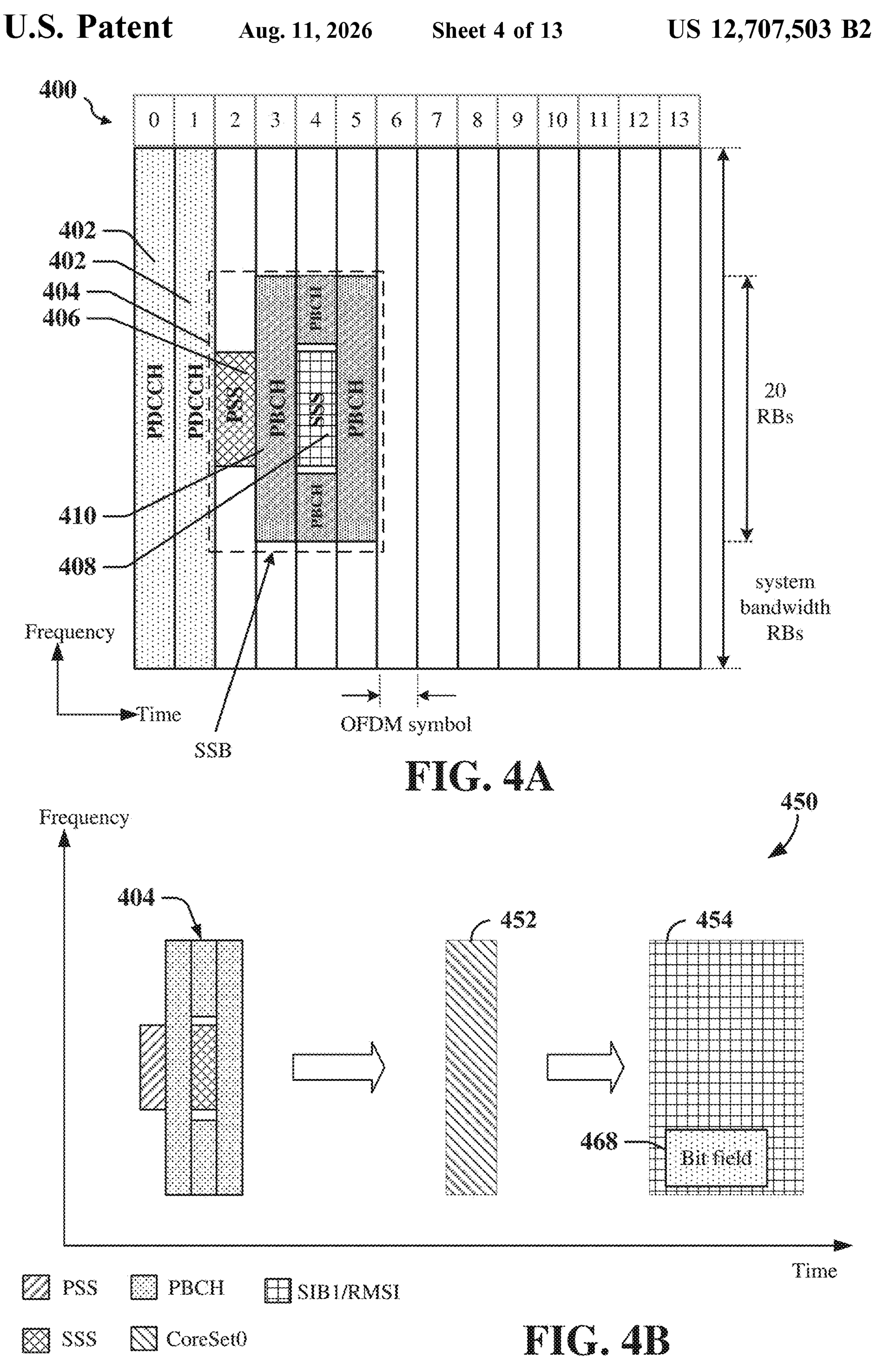
FIG. 4A is a diagram illustrating an example of a frame structure of synchronization signals for use in a wireless communication network according to some aspects.
FIG. 4B is a diagram illustrating an example of a portion of a frame or subframe structure with various channels and associated messages for use in a wireless communication network according to some aspects.

FIG. 4A illustrates an example 400 of various downlink channels within a subframe of a frame including channels used for initial access and synchronization. As shown in FIG. 4A, a physical downlink control channel (PDCCH) 402 is transmitted in at least two symbols (e.g., symbol 0 and symbol 1) and may carry DCI within one or more control channel elements (CCEs), with each CCE including nine RE groups (REGs), and each REG including four consecutive REs in an OFDM symbol. Additionally, FIG. 4A illustrates an exemplary synchronization signal block (SSB) 404 that may be periodically transmitted by a base station or gNB. The SSB 404 carries synchronization signals PSS 406 and SSS 408 and broadcast channels (PBCH) 410. In this example, the SSB 404 contains one PSS symbol (shown in symbol 2), one SSS symbol (shown in symbol 4) and two PBCH symbols (shown in symbols 3 and 5). The PSS and SSS combination may be used to identify physical cell identities. A UE uses the PSS to determine subframe/symbol timing and a physical layer identity. The SSS is used by a UE to determine a physical layer cell identity group number and radio frame timing. Based on the physical layer identity and the physical layer cell identity group number, the UE can determine a physical cell identifier (PCI). Also, based on the PCI, the UE can determine the locations of the aforementioned DMRS. The physical broadcast channel (PBCH), which carries a master information block (MIB), is logically grouped with the PSS and SSS to form the synchronization signal; i.e., SSB 404. The MIB provides a number of RBs in the system bandwidth and a system frame number (SFN).

FIG. 4B is a diagram illustrating various broadcast information 450 related to initial cell access according to some examples. The broadcast information 450 may be transmitted by a RAN node (e.g., a base station, such as an eNB or gNB) on resources (e.g., time-frequency resources) allocated for the transmission of the broadcast information 450 in a cell. The broadcast information 450 includes SSB 404 illustrated in FIG. 4A. It is noted that the PBCH in SSB 404 includes the MIB carrying various system information (SI) including, for example, a cell barred indication, the subcarrier spacing, the system frame number, and scheduling information for a CORESET0 452. For example, the PBCH in SSB 404 may include scheduling information indicating time-frequency resources allocated for the CORESET0 452. In some examples, the CORESET0 452 may be transmitted within the first four symbols (e.g., within a control region) of a slot. In addition, the CORESET0 452 carries a PDCCH with DCI that contains scheduling information for scheduling the SIB1 454. The SIB1 454 is carried within a physical downlink shared channel (PDSCH) within a data region of a slot. In addition, the SIB1 454 may be referred to as RMSI and includes, for example, a set of radio resource parameters providing network identification and configuration. For example, the set of radio resource parameters may include a bandwidth (e.g., number of BWPs) on which a UE may communicate with a base station.

FIG. 4B also illustrates that the RMSI of the SIB1 message 454 may also include a bit field 468. The time/frequency location of this bit field 468 is merely exemplary to show that this bit field 468 utilizes some of the time and frequency resources of the SIB1 message 454.

The MIB in the PBCH may include system information (SI), along with parameters for decoding a SIB (e.g., SIB1). Examples of SI transmitted in the MIB may include, but are not limited to, a subcarrier spacing, system frame number, a configuration of a PDCCH control resource set (CORESET) (e.g., PDCCH CORESET0), and a search space for SIB1. Examples of SI transmitted in the SIB1 may include, but are not limited to, a random access search space, downlink configuration information, and uplink configuration information. The MIB and SIB1 together provide the minimum SI for initial access.

A brief discussion of an initial access procedure for a UE using the above information follows. As discussed above, a BS may transmit synchronization signals (e.g., including PSS and SSS) in the network to enable UEs to synchronize with the BS, as well as SI (e.g., including a MIB, RMSI, and OSI) to facilitate initial network access. The BS may transmit the PSS, the SSS, and/or the MIB via SSBs over the PBCH and may broadcast the RMSI and/or the OSI over the PDSCH.

A UE attempting to access a RAN may perform an initial cell search by detecting a PSS from a BS (e.g., the PSS of a cell of the BS) of the RAM. The PSS may enable the UE to synchronize to period timing of the BS and may indicate a physical layer identity value assigned to the cell. The UE may also receive an SSS from the BS that enables the UE to synchronize on the radio frame level with the cell. The SSS may also provide a cell identity value, which the UE may combine with the physical layer identity value to identify the cell.

After receiving the PSS and SSS, the UE may receive the SI from the BS. The system information may take the form of the MIB and Ms discussed above. The system information includes essential or critical information for a UE to access the network such as downlink (DL) channel configuration information, uplink (UL) channel configuration information, access class information, and cell barring information, as well as other less critical information. The MIB may include SI for initial network access and scheduling information for RMSI and/or OSI. After decoding the MIB, the UE may receive the RMSI and/or the OSI.

The SI includes information that enables a UE to determine how to conduct an initial access to a RAN (e.g., the RAN 200 of FIG. 2). In some examples, SIB2 includes random access configuration information (e.g., a RACH configuration) that indicates the resources that the UE is to use to communicate with the RAN during initial access. The random access configuration information may indicate, for example, the resources allocated by the RAN for a PRACH procedure. For example, the RACH configuration may indicate the resources allocated by the network for the UE to transmit a PRACH preamble and to receive a random access response. In some examples, the RACH configuration identifies monitoring occasions (MOs) that specify a set of symbols (e.g., in a PRACH slot) that are scheduled by a base station for the PRACH procedure. The RACH configuration may also indicate the size of a random access response window during which the UE is to monitor for a response to a PRACH preamble. The RACH configuration may further specify that the random access response window starts a certain number of sub-frames after the end of the PRACH preamble in some examples. After obtaining the MIB, the RMSI and/or the OSI, the UE may thus perform a random access procedure for initial access to the RAN.

Figure 5:
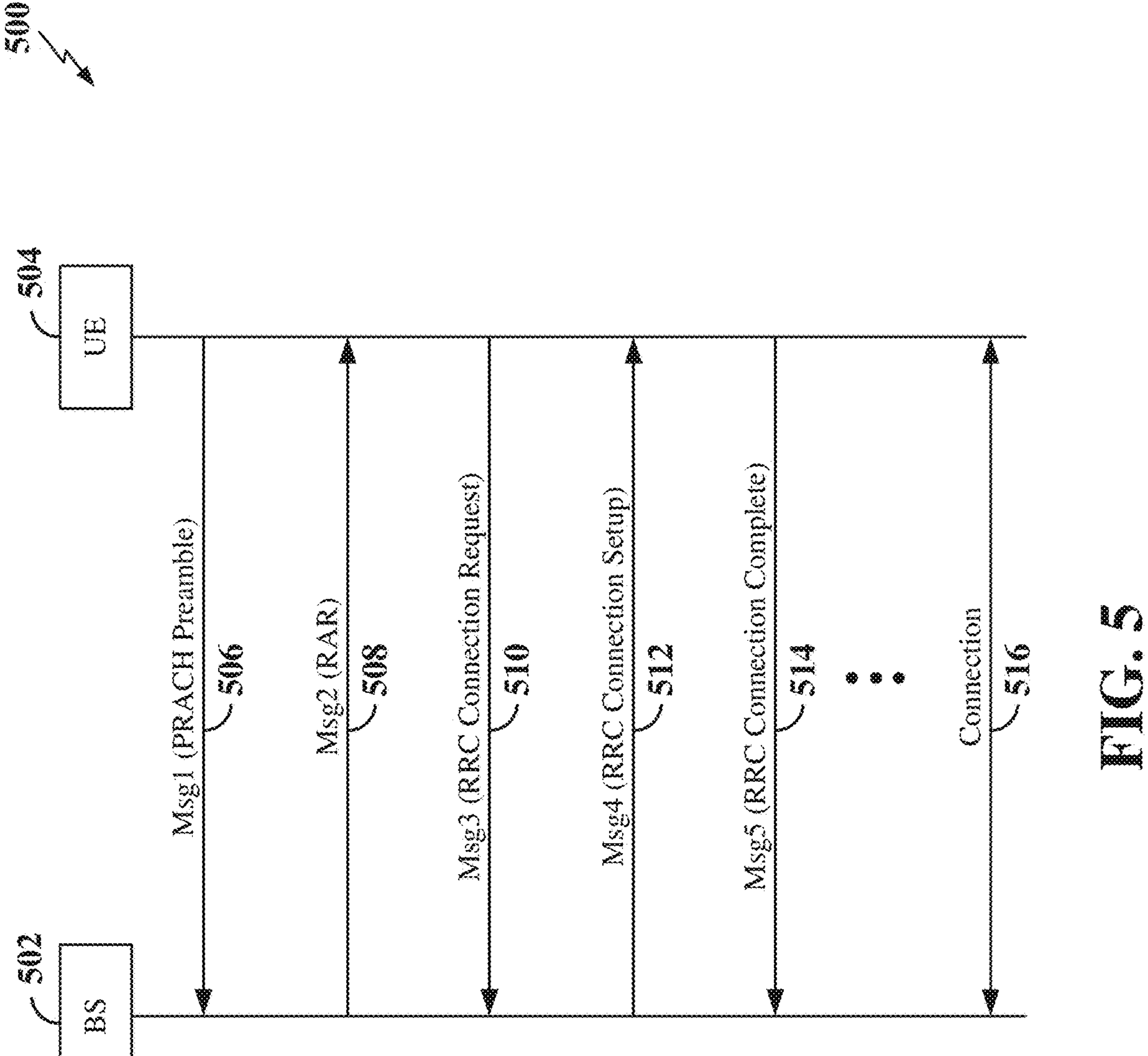
FIG. 5 is a signaling diagram of an example of random access channel (RACH) signaling according to some aspects.

FIG. 5 is a signaling diagram 500 illustrating an example of signaling for a contention-based RACH procedure in a wireless communication system including a base station (BS) 502 and a UE 504. In some examples, the base station 502 may correspond to any of the base stations or scheduling entities shown in any of FIGS. 1, 2, 6, 9, and 12. In some examples, the UE 504 may correspond to any of the UEs or scheduled entities shown in any of FIGS. 1, 2, 6, 9, and 10.

At step 506 of FIG. 5, the UE 504 transmit a message 1 (Msg1) of the RACH procedure to the BS 502. In some examples, the Msg1 is a PRACH preamble. RACH Msg1 may be referred to as PRACH. As mentioned above, the UE 504 may transmit the PRACH preamble on resources specified by a RACH configuration included in SIB2.

At step 508, the BS 502 responds to the PRACH preamble with a message 2 (Msg2) of the RACH procedure. The Msg 2 may be referred to informally as a random access response (RAR). In some examples, the BS 502 transmits a DCI on a PDCCH, where the DCI schedules a PDSCH (e.g., the DCI specifies the resources for the PDSCH transmission). The BS 502 then transmits the PDSCH which includes the RAR data such as, for example, an UL grant for the UE to transmit a message 3 (Msg3) of the RACH procedure.

In some examples, the UE monitors for the Msg2 on resources specified by the RACH configuration during the RAR window specified by the RACH configuration. For example, the UE may decode the DCI carried on the PDCCH and then decode the RAR carried on the PDSCH.

At step 510, upon receiving all of the RAR information, the UE 504 transmits the Msg3 of the RACH procedure. In some examples, the Msg3 is an RRC Connection Request message.

At step 512, the BS 502 responds with a message 4 (Msg4) of the RACH procedure. In some examples, the Msg 4 is an RRC Connection Setup message.

At step 514, the UE 504 responds with a message 5 (Msg5) of the RACH procedure. In some examples, the Msg 5 is an RRC Connection Complete message.

As indicated by step 516, the BS 502 and the UE 504 ultimately establish a connection and enter an active operational phase where data may be exchanged. For example, the BS may schedule the UE for UL communication and/or DL communication as discussed herein.

A wireless communication network may support different types of services. For example, a network may carry traffic with different priorities, traffic with different latency requirements (e.g., IoT traffic versus voice-over-Interpret-protocol (VoIP) traffic, etc.), traffic with different bandwidth requirements, traffic with different throughput requirements, and so on. In some examples, these different types of services may be referred to as network slices (e.g., one "slice" of the network supports one service, another "slice" of the network supports another service, and so on). In some aspects, a slice may refer to a set of network entities that can provide a particular service for a UE. In some aspects, a slice may refer to a logical network that supports certain capabilities and that has certain characteristics.

To support different services (slices), a network may provide appropriate functionality to handle the requirements of the different services. However, a given network might not support all types of services. Thus, a network may indicate to a UE which services are supported.

In some examples, network slices are negotiated through the use of a NAS Registration procedure. Here, different types of slices may be defined by corresponding network slice selection assistance information (NSSAI). For example, a given slice may be identified by a single NSSAI (S-NSSAI). A set of S-NSSAIs may be referred to, for convenience, simply as an NSSAI. In some examples, an S-NSSAI may include a slice/service type (SST) which may specify the features and services of the slice. In some examples, an S-NSSAI may include a slice differentiator (SD) that may, for example, distinguish slices that have the same SST. Examples of SSTs include enhanced mobile broadband (eMBB), ultra-reliable low-latency communication (URLLC), and massive IoT (MIoT). Other types of SSTs may be defined as well.

Figure 6:
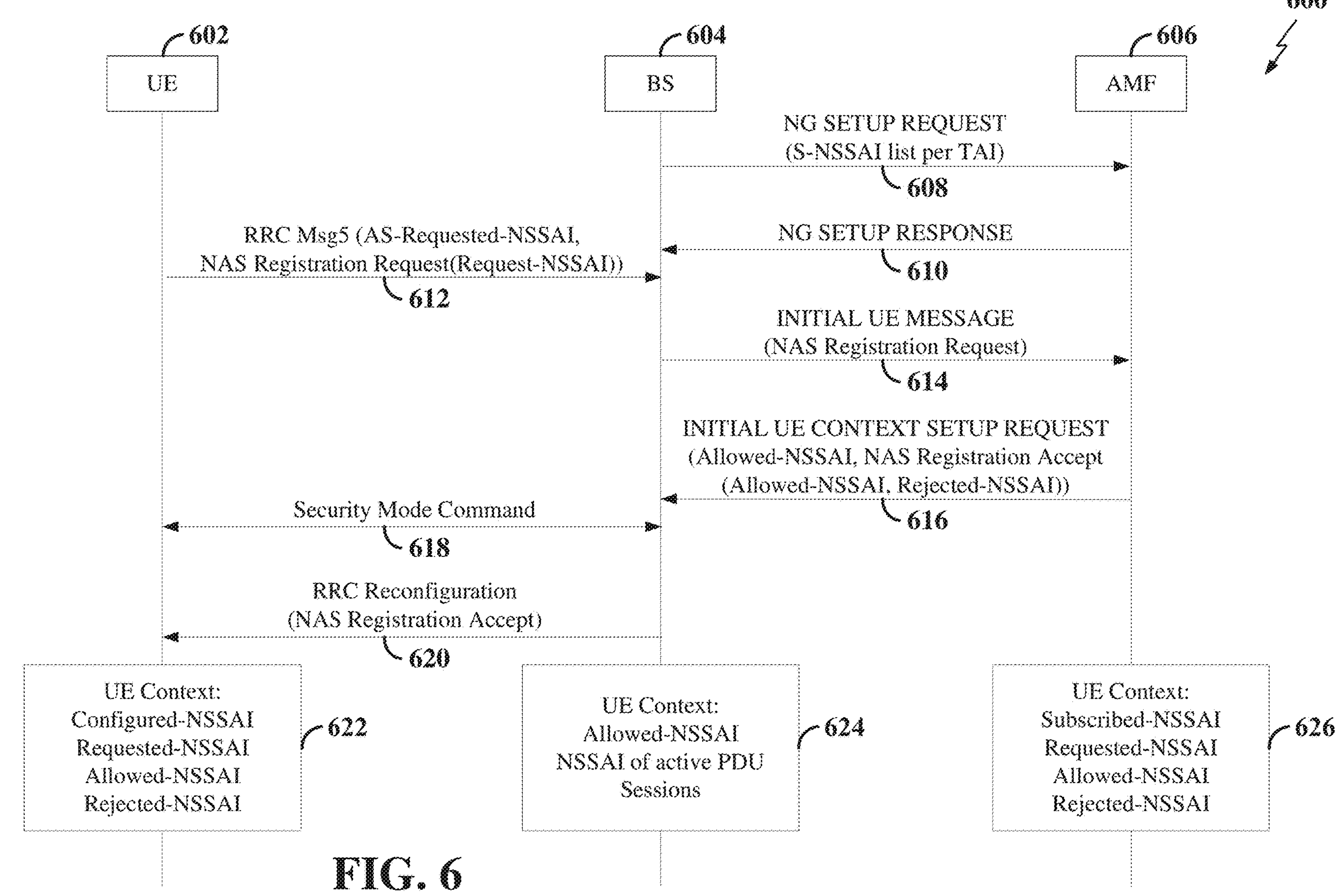
FIG. 6 is a signaling diagram of an example of slice-related signaling according to some aspects.

FIG. 6 is a signaling diagram 600 illustrating an example of NAS-related signaling in a wireless communication system including a UE 602, a base station (BS) 604 such as a gNB, and an access and mobility management function (AMF) 606. In some examples, the UE 602 may correspond to any of the UEs or scheduled entities shown in any of FIGS. 1, 2, 5, 9, and 10. In some examples, the BS 604 may correspond to any of the base stations or scheduling entities shown in any of FIGS. 1, 2, 5, 9, and 12.

At step 608 of FIG. 6, the BS 604 sends a 5G Core Network Next Generation (NG) Setup Request message to the AMF 606. This message may indicate each single NSSAI list per tracking area identifier (TAI). In some examples, slice support may be uniform within a given tracking area.

At step 610, the AMF 606 sends an NG Setup Response message to the BS 604 in response to the NG Setup Request message.

At step 612, as part of a RACH procedure, the UE 602 may send an RRC Msg5 to the BS 604. In some examples, Msg5 may include a NAS Registration Request. This message may include an indication of an NSSAI requested by an access stratum (AS) layer of the UE 602.

In some examples, the UE 602 may send a NAS Registration Request message. This message may include an indication of a requested NSSAI.

At step 614, the BS 604 sends an Initial UE message to the AMF 606. This message may include an indication of the NSSAI requested by the UE 602.

At step 616, the AMF 606 sends an Initial UE Context Setup Request message to the BS 604. This message indicates the NSSAI allowed by the network and the NSSAI rejected by the network.

In some examples, the allowed NSSAI may include the minimal common set of the Requested NSSAI (or default S-NSSAIs if no valid S-NSSAIs are requested), the Subscribed NSSAI, and the current TAI supported NSSAI.

At step 618, the UE 602 and the BS 604 exchange Security Mode Command information.

At step 620, the BS 604 sends an RRC Configuration message accepting the NAS registration to the UE 602.

As indicated by block 622, the UE context at the UE 602 indicates the NSSAI configured by the network, the NSSAI requested by the UE, the NSSAI allowed by the network, and the NSSAI rejected by the network.

As indicated by block 624, the UE context at the BS 604 indicates the NSSAI allowed by the network and the NSSAI of all active protocol data unit (PDU) sessions.

As indicated by block 626, the UE context at the AMF 606 indicates the NSSAI subscribed at the network, the NSSAI requested by the UE, the NSSAI allowed by the network, and the NSSAI rejected by the network.

In some examples, an AS-Requested-NSSAI in Msg5 may be used for AMF selection. This request may be a subset of NAS Requested-NSSAI due to security concerns (e.g., if Msg5 does not have security protection).

In some examples, PDU Session Establishment is associated with a slice in the Allowed-NSSAI. For example, a PDU session may be established for each S-NSSAI.

In 3GPP Rel. 15, there is no RACH resource partitioning, i.e., only a cell-specific RACH resource is allowed. RACH parameter prioritization (e.g., prioritization of a 'preamble ramping step' and a 'backoff scaling factor') was introduced in Rel-15 and can be used for prioritized RACH access in handover (HO) and beam failure reporting (BFR). RACH parameter prioritization may be used for a 4-step RACH or a 2-step RACH. RACH parameter prioritization may be used for a mission critical service (MCS) triggered RACH and a multimedia priority service (MPS) triggered RACH. However, in implementations such as 3GPP Rel. 15, all slices share the same random access (RA) resources and cannot be differentiated by the network.

Thus, conventional RACH configuration techniques do not differentiate between services (slices). However, it may be advantageous to use different RACH configurations for different slices. For example, more frequent RACH occasions could be used for URLLC, thereby improving the RACH performance for URLLC.

The disclosure relates in some aspects to a slice-aware RACH. Two examples of a slice-aware RACH follow. In a first example, RACH resource partitioning/isolation may be used to provide access resource isolation (e.g., for industrial application). In some aspects, this example may provide guaranteed random access (RA) resources for their slices. In a second example, parameter prioritization may be used to prioritize slices during the RA procedure. When the slice number is large, however, these examples may result in resource fragmentation for RACH resource isolation and too many prioritized parameters for the UE.

The disclosure relates in some aspects to slice-based RACH configurations. In some examples, a slice-aware RACH is provided with group-based RACH resource partitioning and parameter prioritization.

The disclosure relates in some aspects to using RACH resource partitioning/isolation together with parameter prioritization for different targets. For example, some slices with a similar use case can be grouped with the same prioritized parameter set, and one dedicated (e.g., isolated) RACH resource can be reserved for the most sensitive slice (e.g., the slice with the most stringent traffic requirement(s)) within the slice group. Examples of use cases may include industrial traffic, mission critical traffic, emergency alert traffic, low latency traffic, high throughput traffic, sensor traffic, best effort traffic, and so other. Other use cases may be specified in other examples.

The disclosure relates in some aspects to group-based RACH resource partitioning and parameter prioritization. In some examples, RRC, SIB or NAS signaling may be used to configure one or more slice groups, where each slice group includes one or more slices. In addition, via RRC or SIB signaling, each slice group can be configured with the same dedicated (isolated) RACH resource or the same RACH parameter set, and the other approach (prioritized parameters) can be applied for slices within a slice group. Depending on the different triggers for RACH, a UE's AS may select the corresponding RACH resources/parameters for RACH access.

The disclosure relates in some aspects to a group-slice-aware RACH. Via RRC, SIB, or NAS signaling, a UE may be configured with one or more slice groups, where each slice group includes one or more slices. Slices within one group may have a similar use case (e.g., industrial use case, medical use case, etc.), but the priorities of different slices may be different. For example, URLLC slices and smart metering slices may be configured as one group, but the URLLC slices may be given higher priority. Via RRC or SIB signaling, each slice group can be configured with the same isolated RACH resource or the same RACH parameter set, and the other approach (different RACH resources) can be applied for one or more slices within a slice group.

Depending on the different triggers for the RACH, a UE's AS may select the corresponding RACH resources/parameters for RACH access. In some examples, if RACH is triggered by arriving service/traffic, the UE's NAS provides service/slice information to the AS. The AS uses the service/slice information to select the appropriate RACH resources/parameters for access. If RACH is not triggered by arrival of traffic (e.g., an initial access RACH), the NAS provides requested NSSAI(s) to the AS. In some examples, the AS uses the service/slice with the highest priority among its requested NSSAI(s) to select the appropriate RACH (e.g., to obtain better RACH performance in a scenario where there are relatively few UEs under a gNB). In some examples, the AS uses the service/slice with the lowest priority among its requested NSSAI(s) to select the appropriate RACH (e.g., to provide fairer sharing of RACH resources in a scenario where there are a large number of UEs under a gNB).

The disclosure relates in some aspects to RACH configurations that specify group-specific parameters and slice specific resources. Via RRC or SIB signaling, each slice group is configured with a different set of RACH parameters. In addition, within each slice group, one or more slices is configured with an isolated RACH resource, and the other slices use a cell specific RACH resource.

The disclosure relates in some aspects to RACH configurations that specify group-specific resources and slice specific parameters. Via RRC or SIB signaling, each slice group is configured with a set of isolated RACH resources. In addition, within each slice group, one or more slices is configured with a set of prioritized RACH parameters, and the other slices use cell specific RACH parameters.

The disclosure relates in some aspects to mobile oriented (MO)/mobile terminated (MT) specific slice groups. In the absence of an explicit slice-based RACH configuration, two slices groups may be implicitly defined at a UE: one group includes all slices triggered by MO traffic (UL direction), and the other group includes all slices triggered by MT traffic (DL direction). For each slice group, RRC/SIB signaling can configure a set of isolated RACH resources or a set of different RACH parameters.

Figure 7:
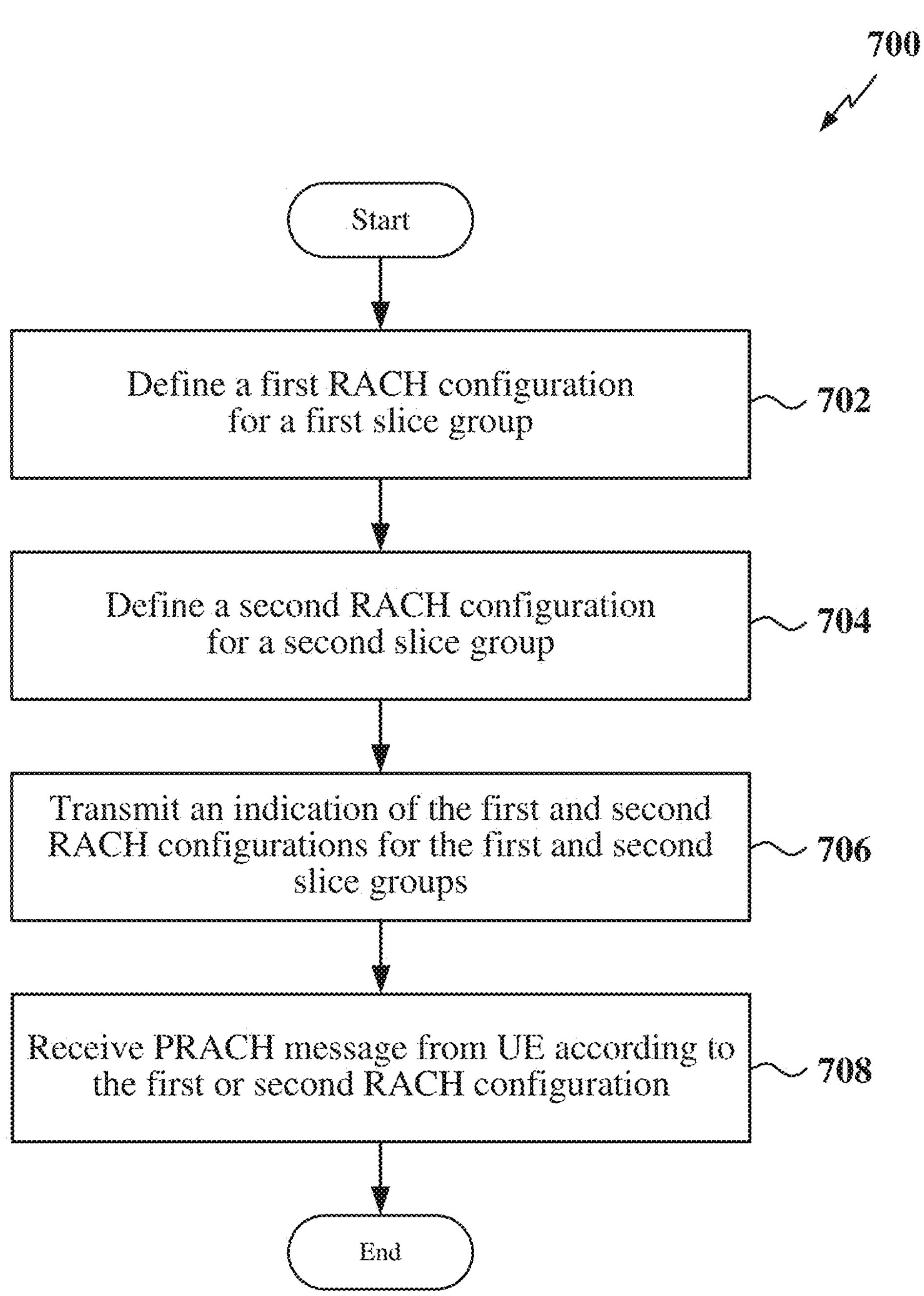
FIG. 7 is a flow chart of an example method for defining slice-specific RACH configurations according to some aspects.

FIG. 7 is a flow chart illustrating an example wireless communication method 700 for a base station (BS) in accordance with some aspects of the present disclosure. As described below, some or all illustrated features may be omitted in a particular implementation within the scope of the present disclosure, and some illustrated features may not be required for implementation of all embodiments. In some examples, the method 700 may be carried out by the BS 1200 illustrated in FIG. 12. In some examples, the method 700 may be carried out by any suitable apparatus or means for carrying out the functions or algorithm described below.

At block 702, a BS defines a first RACH configuration for a first slice group. In some examples, the first RACH configuration or other RACH configurations may be defined for other slice groups.

In one example, the BS may specify that the first slice group is to use a particular RACH resource (e.g., a cell-specific RACH resource or a dedicated RACH resource). A RACH resource may include, for example, one or more RACH preambles and/or one or more RACH occasions (ROs). In some examples, these RACH resources may be prioritized. For example, a higher priority slice group may be assigned more RACH resources, thereby potentially providing better RACH performance (e.g., a quicker connection to the network) for the higher priority slice group.

In addition, the BS may specify a first RACH parameter (e.g., a cell-specific RACH parameter) for a first slice of the first slice group, and second RACH parameter (e.g., a dedicated RACH parameter) for a second slice of the first slice group, and so on. A RACH parameter may include, for example, a preamble ramping step and/or a backoff scaling factor. In some examples, these RACH parameters may be prioritized. For example, a higher priority slice may be assigned a preamble ramping step that ramps up the transmission power for PRACH retransmissions more quickly, thereby potentially providing better RACH performance (e.g., a quicker connection to the network) for the higher priority slice. As another example, a higher priority slice may be assigned a smaller (e.g., closer to zero) backoff scaling factor to reduce the PRACH retransmission backoff time, thereby potentially providing better RACH performance (e.g., a quicker connection to the network) for the higher priority slice.

In another example, the BS may specify that the first slice group is to use a particular RACH parameter (e.g., a cell-specific RACH parameter or a dedicated RACH parameter). In some examples, these RACH parameters may be prioritized. For example, a higher priority slice group may be assigned a preamble ramping step that ramps up the transmission power for PRACH retransmissions more quickly, thereby potentially providing better RACH performance (e.g., a quicker connection to the network) for the higher priority slice group. As another example, a higher priority slice group may be assigned a smaller (e.g., closer to zero) backoff scaling factor to reduce the PRACH retransmission backoff time, thereby potentially providing better RACH performance (e.g., a quicker connection to the network) for the higher priority slice group.

In addition, the BS may specify a first RACH resource (e.g., a cell-specific RACH resource) for a first slice of the first slice group, and second RACH resource (e.g., a dedicated RACH resource) for a second slice of the first slice group, and so on. In some examples, these RACH resources may be prioritized. For example, a higher priority slice may be assigned more RACH resources, thereby potentially providing better RACH performance (e.g., a quicker connection to the network) for the higher priority slice.

At block 704, the BS defines a second RACH configuration for a second slice group. In some examples, the second RACH configuration or other RACH configurations may be defined for other slice groups.

In one example, the BS may specify that the second slice group is to use a particular RACH resource (e.g., a cell-specific RACH resource or a dedicated RACH resource). In addition, the BS may specify a first RACH parameter (e.g., a cell-specific RACH parameter) for a first slice of the second slice group, and second RACH parameter (e.g., a dedicated RACH parameter) for a second slice of the second slice group, and so on.

In another example, the BS may specify that the second slice group is to use a particular RACH parameter (e.g., a cell-specific RACH parameter or a dedicated RACH parameter). In addition, the BS may specify a first RACH resource (e.g., a cell-specific RACH resource) for a first slice of the second slice group, and second RACH resource (e.g., a dedicated RACH resource) for a second slice of the second slice group, and so on.

At block 706, the BS transmits an indication of the first and second RACH configurations for the first and second slice groups. For example, the BS may transmit a SIB, an RCC message, or a NAS message that specifies default RACH configurations (e.g., cell-specific RACH configuration) and/or configures a UE with dedicated RACH configurations (e.g., RACH configurations dedicated for one or more slice groups).

At block 708, the BS receives a PRACH message from a UE according to the first or second RACH configuration. For example, the BS may receive a PRACH message on a RACH resource specified for a particular slice group. As another example, the BS may receive a PRACH message that was transmitted by a UE using at least one RACH parameter specified for a particular slice group. As yet another example, the BS may receive a PRACH message that was transmitted by a UE on a RACH resource specified for a particular slice group and using at least one RACH parameter specified for that particular slice group.

Figure 8:
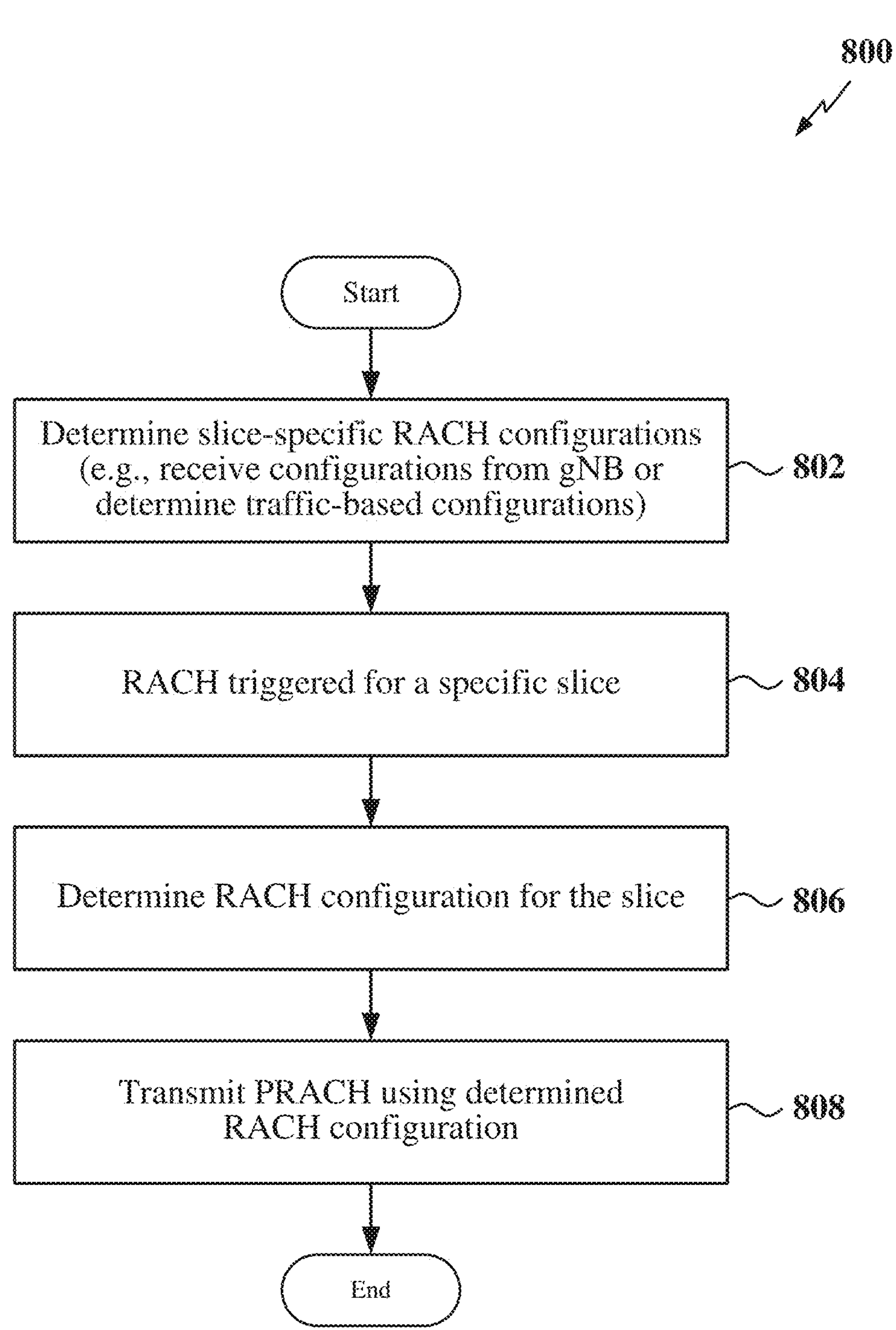
FIG. 8 is a flow chart of an example method for transmitting a random access message using a slice-specific RACH configuration according to some aspects.

FIG. 8 is a flow chart illustrating an example wireless communication method 800 for a UE in accordance with some aspects of the present disclosure. As described below, some or all illustrated features may be omitted in a particular implementation within the scope of the present disclosure, and some illustrated features may not be required for implementation of all embodiments. In some examples, the method 800 may be carried out by the UE 1000 illustrated in FIG. 10. In some examples, the method 800 may be carried out by any suitable apparatus or means for carrying out the functions or algorithm described below.

At block 802, a UE determine slice-specific RACH configurations. In some examples, the UE receives RACH configurations from a gNB (e.g., the RACH configurations transmitted at block 706 of FIG. 7). In some examples (e.g., when the slices are grouped according to MO traffic and MT traffic), the UE determines traffic-based RACH configurations.

At block 804, the UE determines that a RACH is triggered for a particular slice (e.g., for a particular network service). For example, a RACH may be triggered as a result of an application at the UE generating data to be sent to the network. This application may be associated with a particular slice (service) or multiple slices.

At block 806, the UE determines the RACH configuration for the slice. For example, the UE may identify which RACH configuration of the RACH configurations determined at block 802 is specified for the slice group to which the slice belongs.

At block 808, the UE transmits a PRACH using the RACH configuration determined at block 806. For example, the UE may transmit a PRACH message on a RACH resource (e.g., a particular PRACH preamble and/or particular RO(s)) specified for a particular slice group. As another example, the UE may transmit a PRACH message using at least one RACH parameter (e.g., a particular preamble ramping step and/or a particular backoff scaling factor for PRACH retransmissions) specified for a particular slice group. As yet another example, the UE may transmit a PRACH message on a RACH resource specified for a particular slice group and using at least one RACH parameter specified for that particular slice group.

Figure 9:
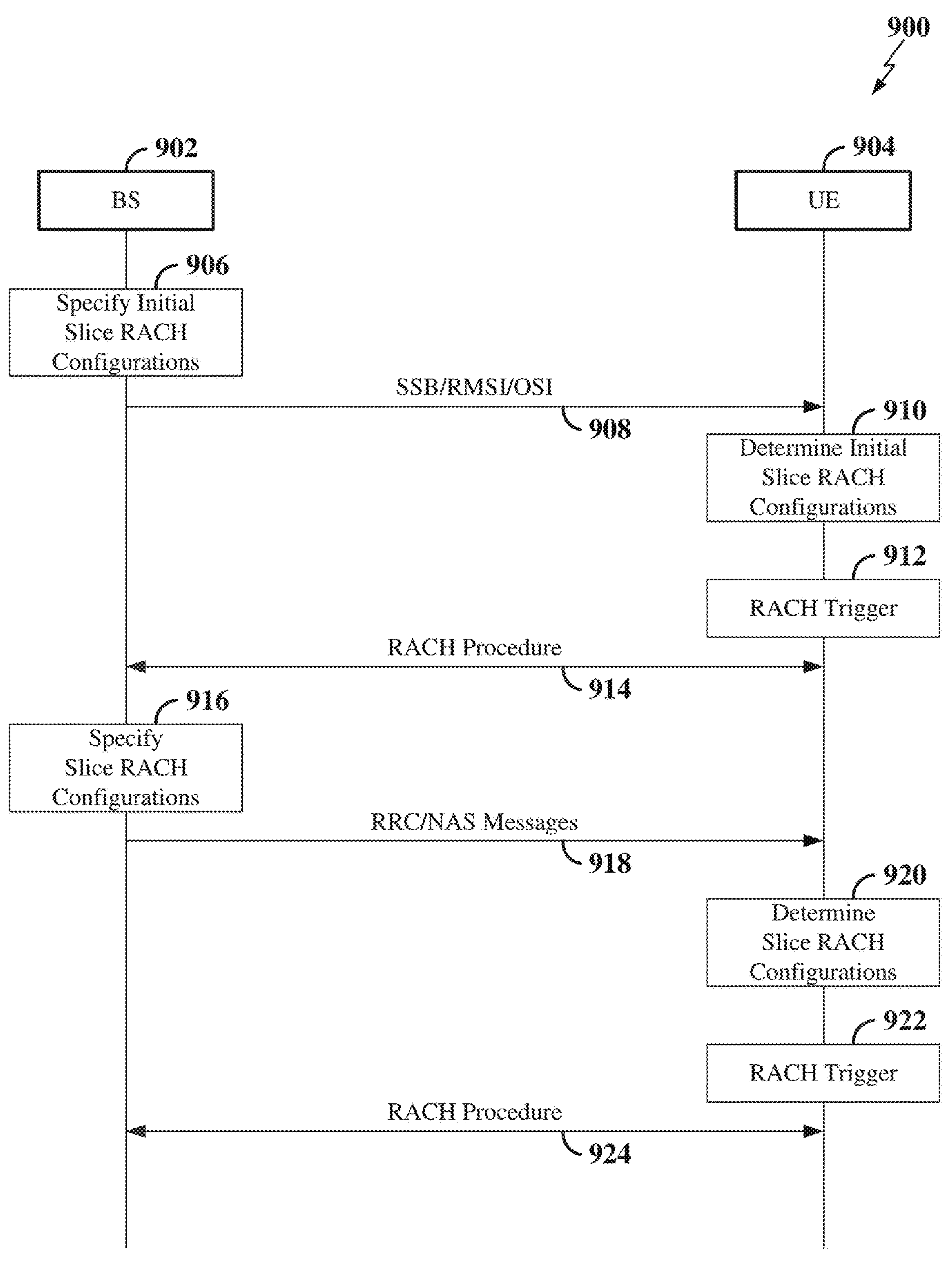
FIG. 9 is a signaling diagram illustrating an example of RACH-related signaling according to some aspects.

FIG. 9 is a signaling diagram 900 illustrating an example of RACH-related signaling in a wireless communication system including a base station (BS) 902 and a UE 904. In some examples, the BS 902 may correspond to any of the base stations or scheduling entities shown in any of FIGS. 1, 2, 5, 6, and 12. In some examples, the UE 904 may correspond to any of the UEs or scheduled entities shown in any of FIGS. 1, 2, 5, 6, and 10.

At step 906 of FIG. 9, the BS 902 may specify initial slice-specific RACH configurations. For example, the BS 902 may define multiple slice groups where different RACH configurations are assigned to different slice groups. In some examples, the BS 902 may specify that some slice groups are to use one or more cell-specific RACH resources and that other slice groups are to use one or more dedicated RACH resources. In some examples, the BS 902 may specify that some slice groups are to use one or more cell-specific RACH parameters and that other slice groups are to use one or more dedicated RACH parameters.

At step 908, the BS 902 broadcasts SSB, RMSI, and OSI. In some examples, a SIB in the OSI may specify indicate the RACH configurations specified at step 906.

At step 910, the UE 904 determines its initial slice-specific RACH configurations. In some examples, the UE receives an indication of the RACH configurations from the BS 902 at step 908. In some examples (e.g., when the slices are grouped according to MO and MT traffic), the UE determines the RACH configuration(s) to be used for MO traffic and the RACH configuration(s) to be used for MT traffic.

At step 912, a RACH is triggered at the UE 904. For example, a RACH may be triggered as a result of traffic generated for a particular service (slice) at the UE 904. As discussed above, the UE determines the RACH configuration for the service (slice).

At step 914, the BS 902 and the UE 904 conduct a RACH procedure based on the corresponding RACH configuration for the service (slice). For example, the UE 904 may transmit the PRACH on a RACH resource and/or using a RACH parameter specified for the service (slice).

Subsequently, at step 916, the BS 902 may specify UE-specific slice-specific RACH configurations. For example, the BS 902 may define multiple slice groups for the UE where different RACH configurations are assigned to different slice groups. In some examples, the BS 902 may specify that some slice groups for the UE are to use one or more cell-specific RACH resources and that other slice groups for the UE are to use one or more dedicated RACH resources. In some examples, the BS 902 may specify that some slice groups for the UE are to use one or more cell-specific RACH parameters and that other slice groups for the UE are to use one or more dedicated RACH parameters.

At step 918, the UE 904 the BS 902 transmits one or more RRC messages and/or NAS messages to the UE 904 that indicate the RACH configurations specified at step 916.

At step 920, the UE 904 determines the slice-specific RACH configurations indicated in the RRC message(s) and/or NAS message(s) of step 918.

At step 922, a RACH is triggered at the UE 904. Here, the UE may determine the RACH configuration for the corresponding service (slice) based on the slice-specific RACH configurations determined at step 920.

At step 924, the BS 902 and the UE 904 conduct a RACH procedure based on the corresponding RACH configuration for the service (slice). For example, the UE 904 may transmit the PRACH on a dedicated RACH resource and/or using a dedicated RACH parameter specified for the service (slice).

Figure 10:
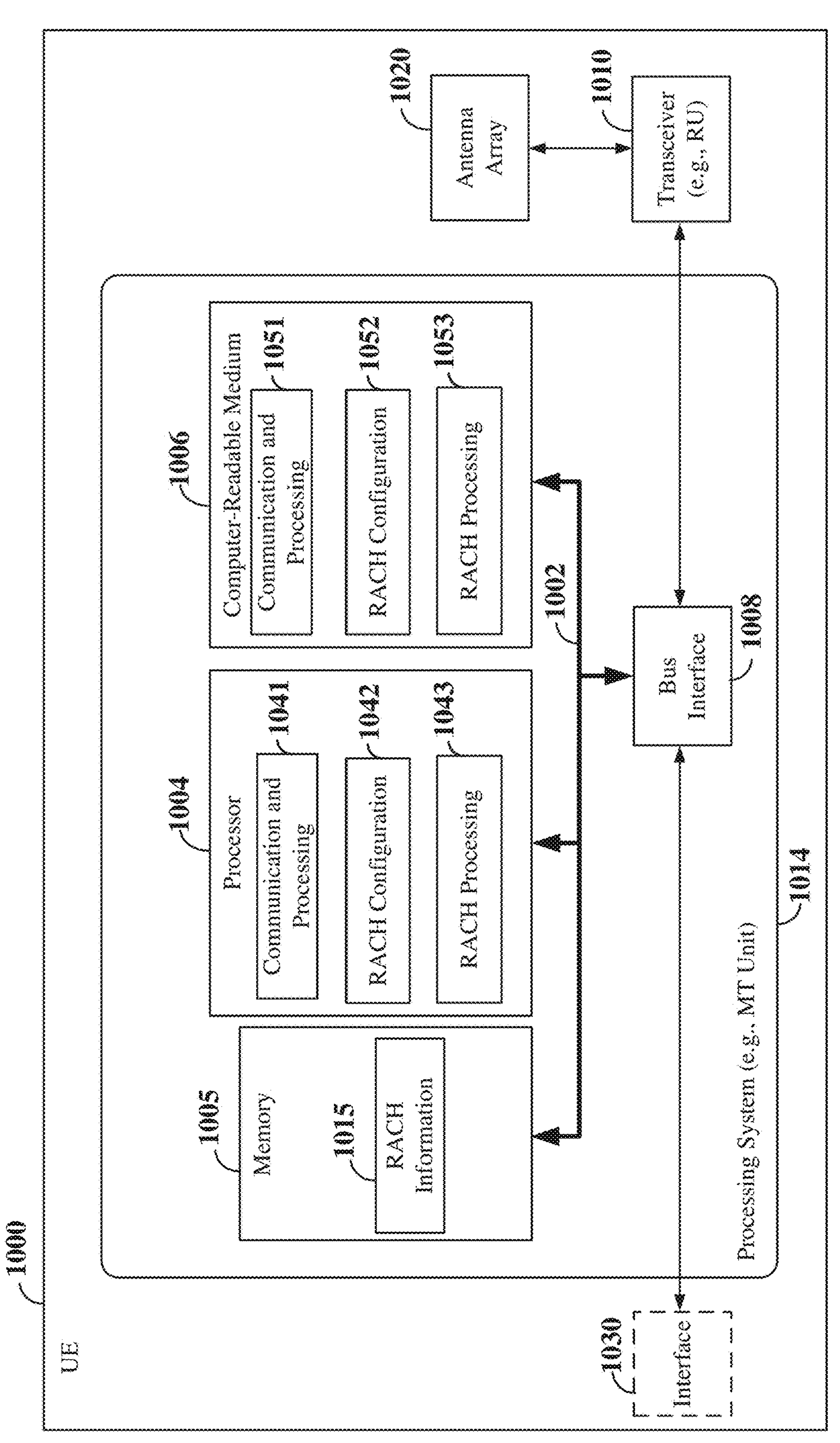
FIG. 10 is a block diagram illustrating an example of a hardware implementation for a user equipment employing a processing system according to some aspects.

FIG. 10 is a block diagram illustrating an example of a hardware implementation for a UE 1000 employing a processing system 1014. For example, the UE 1000 may be a device configured to wirelessly communicate with a base station, as discussed in any one or more of FIGS. 1-9. In some implementations, the UE 1000 may correspond to any of the UEs or scheduled entities shown in any of FIGS. 1, 2, 5, 6, and 9.

In accordance with various aspects of the disclosure, an element, or any portion of an element, or any combination of elements may be implemented with the processing system 1014. The processing system 1014 may include one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1000 may be configured to perform any one or more of the functions described herein. That is, the processor 1004, as utilized in a UE 1000, may be used to implement any one or more of the processes and procedures described herein.

The processor 1004 may in some instances be implemented via a baseband or modem chip and in other implementations, the processor 1004 may include a number of devices distinct and different from a baseband or modem chip (e.g., in such scenarios as may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010 and between the bus 1002 and an interface 1030. The transceiver 1010 provides a communication interface or means for communicating with various other apparatus over a wireless transmission medium. In some examples, the UE may include two or more transceivers 1010, each configured to communicate with a respective network type (e.g., terrestrial or non-terrestrial). The interface 1030 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1030 may include a user interface (e.g., keypad, display, speaker, microphone, joystick). Of course, such a user interface is optional, and may be omitted in some examples, such as an IoT device.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software. For example, the memory 1005 may store RACH information 1015 (e.g., slice-related parameters) used by the processor 1004 in cooperation with the transceiver 1010 for transmitting and/or receiving RACH messages.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1000 may be configured to perform any one or more of the operations described herein (e.g., as described above in conjunction with FIGS. 1-9 and as described below in conjunction with FIG. 11). In some aspects of the disclosure, the processor 1004, as utilized in the UE 1000, may include circuitry configured for various functions.

The processor 1004 may include communication and processing circuitry 1041. The communication and processing circuitry 1041 may be configured to communicate with a base station, such as a gNB. The communication and processing circuitry 1041 may include one or more hardware components that provide the physical structure that performs various processes related to wireless communication (e.g., signal reception and/or signal transmission) as described herein. The communication and processing circuitry 1041 may further include one or more hardware components that provide the physical structure that performs various processes related to signal processing (e.g., processing a received signal and/or processing a signal for transmission) as described herein. In some examples, the communication and processing circuitry 1041 may include two or more transmit/receive chains, each configured to process signals in a different RAT (or RAN) type. The communication and processing circuitry 1041 may further be configured to execute communication and processing software 1051 included on the computer-readable medium 1006 to implement one or more functions described herein.

In some examples, the communication and processing circuitry 1041 may be configured to receive and process downlink beamformed signals at a mmWave frequency or a sub-6 GHz frequency via the transceiver 1010 and an antenna array 1020. For example, the communication and processing circuitry 1041 may be configured to receive a respective reference signal (e.g., SSB or CSI-RS) on each of a plurality of downlink beams from the base station during a downlink beam sweep via at least one first antenna panel of the antenna array 1020. The communication and processing circuitry 1041 may further be configured to transmit a beam measurement report to the base station.

In some examples, the communication and processing circuitry 1041 may further be configured to generate and transmit uplink beamformed signals at a mmWave frequency or a sub-6 GHz frequency via the transceiver 1010 and the antenna array 1020. For example, the communication and processing circuitry 1041 may be configured to transmit a respective reference signal (e.g., SRS or DMRS) on each of a plurality of uplink beams to the base station during an uplink beam sweep via at least one second antenna panel of the antenna array 1020.

The communication and processing circuitry 1041 may further be configured to generate and transmit a request to the base station. For example, the request may be included in a MAC-CE carried in a PUSCH, UCI in a PUCCH or PUSCH, a random access message, or an RRC message. The communication and processing circuitry 1041 may further be configured to generate and transmit a scheduling request (e.g., via UCI in a PUCCH) to the base station to receive an uplink grant for the PUSCH carrying the MAC-CE including the request for uplink beam refinement.

The communication and processing circuitry 1041 may further be configured to generate and transmit an uplink signal on one or more uplink transmit beams applied to the uplink signal. The uplink signal may include, for example, a PUCCH, PUSCH, SRS, DMRS, or PRACH.

The communication and processing circuitry 1041 may further be configured to control the antenna array 1020 and the transceiver 1010 to search for and identify a plurality of downlink transmit beams during a downlink beam sweep. The communication and processing circuitry 1041 may further be configured to obtain a plurality of beam measurements on each of a plurality of downlink receive beams via the antenna array 1020 for each of the identified downlink transmit beams. The communication and processing circuitry 1041 may further be configured to generate a beam measurement report for transmission to the base station using the communication and processing circuitry 1041.

The communication and processing circuitry 1041 may further be configured to identify one or more selected uplink beam(s) based on the beam measurements obtained from the downlink beam reference signals. In some examples, the communication and processing circuitry 1041 may be configured to compare the respective reference signal received power (RSRP) (or other beam measurement) measured on each of the downlink receive beams for each of the serving downlink transmit beams to identify the serving downlink receive beams and to further utilize the serving downlink receive beams as the selected uplink transmit beams. Each serving downlink receive beam may have the highest measured RSRP (or other beam measurement) for one of the downlink transmit beams.

The communication and processing circuitry 1041 may be configured to generate one or more uplink transmit beams for transmission in an uplink beam sweep. Each uplink transmit beam may carry an uplink reference signal (e.g., an SRS) for measurement by the base station. The communication and processing circuitry 1041 may further be configured to identify the selected uplink transmit beam(s) selected by the base station based on the uplink beam measurements. For example, the communication and processing circuitry 1041 may be configured to receive an indication of the selected uplink transmit beam(s) from the base station.

In some implementations where the communication involves receiving information, the communication and processing circuitry 1041 may obtain information from a component of the UE 1000 (e.g., from the transceiver 1010 that receives the information via radio frequency signaling or some other type of signaling suitable for the applicable communication medium), process (e.g., decode) the information, and output the processed information. For example, the communication and processing circuitry 1041 may output the information to another component of the processor 1004, to the memory 1005, or to the bus interface 1008. In some examples, the communication and processing circuitry 1041 may receive one or more of signals, messages, other information, or any combination thereof. In some examples, the communication and processing circuitry 1041 may receive information via one or more channels. In some examples, the communication and processing circuitry 1041 may include functionality for a means for receiving. In some examples, the communication and processing circuitry 1041 may include functionality for a means for decoding.

In some implementations where the communication involves sending (e.g., transmitting) information, the communication and processing circuitry 1041 may obtain information (e.g., from another component of the processor 1004, the memory 1005, or the bus interface 1008), process (e.g., encode) the information, and output the processed information. For example, the communication and processing circuitry 1041 may output the information to the transceiver 1010 (e.g., that transmits the information via radio frequency signaling or some other type of signaling suitable for the applicable communication medium). In some examples, the communication and processing circuitry 1041 may send one or more of signals, messages, other information, or any combination thereof. In some examples, the communication and processing circuitry 1041 may send information via one or more channels. In some examples, the communication and processing circuitry 1041 may include functionality for a means for sending (e.g., a means for transmitting). In some examples, the communication and processing circuitry 1041 may include functionality for a means for encoding.

The processor 1004 may include RACH configuration circuitry 1042 configured to perform RACH configuration-related operations as discussed herein (e.g., one or more of the operations described in conjunction with FIGS. 7-9). The RACH configuration circuitry 1042 may include functionality for a means for identifying a service (e.g., as described at block 804 of FIG. 8 and/or step 912 of FIG. 9 and/or block 1102 of FIG. 11). The RACH configuration circuitry 1042 may include functionality for a means for selecting a RACH configuration (e.g., as described at block 806 of FIG. 8 and/or steps 912 and 922 of FIG. 9 and/or block 1104 of FIG. 11). The RACH configuration circuitry 1042 may further be configured to execute RACH configuration software 1052 included on the computer-readable medium 1006 to implement one or more functions described herein.

The processor 1004 may include RACH processing circuitry 1043 configured to perform RACH processing-related operations as discussed herein (e.g., one or more of the operations described in conjunction with FIGS. 7-9). The RACH processing circuitry 1043 may include functionality for a means for conducting a RACH operation (e.g., as described at block 808 of FIG. 8 and/or steps 914 and 924 of FIG. 9 and/or block 1106 of FIG. 11). The RACH processing circuitry 1043 may further be configured to execute RACH processing software 1053 included on the computer-readable medium 1006 to implement one or more functions described herein.

Figure 11:
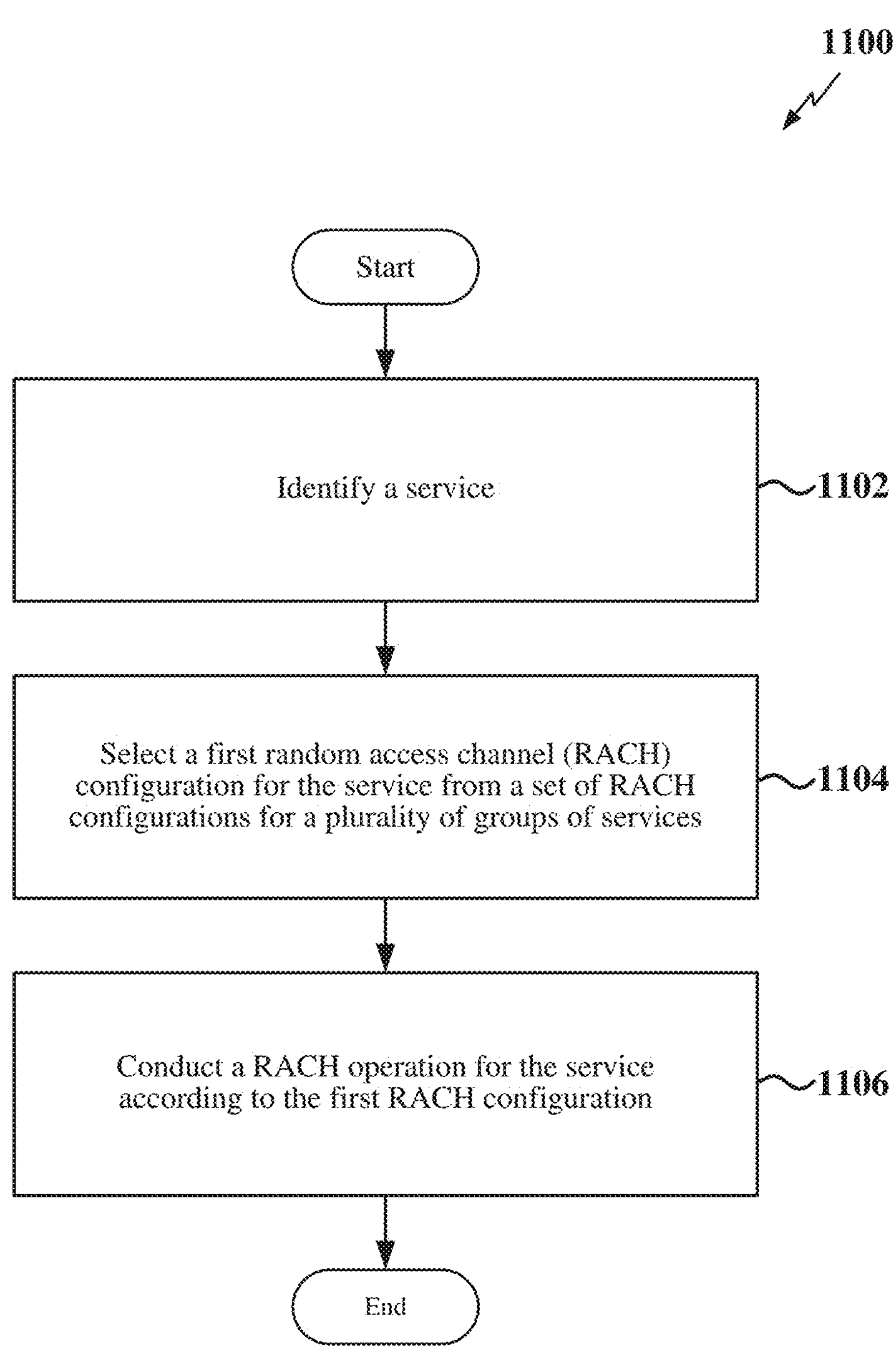
FIG. 11 is a flow chart of an example random access method according to some aspects.

FIG. 11 is a flow chart illustrating an example wireless communication method 1100 according to some aspects of the disclosure. As described herein, some or all illustrated features may be omitted in a particular implementation within the scope of the present disclosure, and some illustrated features may not be required for implementation of all embodiments. In some examples, the method 1100 may be carried out by the UE 1000 illustrated in FIG. 10. In some examples, the method 1100 may be carried out by any suitable apparatus or means for carrying out the functions or algorithm described below.

At block 1102, a UE may identify a service (e.g., a network slice). For example, the RACH configuration circuitry 1042, shown and described above in connection with FIG. 10, may determine that an application running on the UE has generated data associated with a particular service. In addition, the RACH configuration circuitry 1042 may identify a particular network slice associated with that service.

At block 1104, the UE may select a first random access channel (RACH) configuration for the service from a set of RACH configurations for a plurality of groups of services. For example, the RACH configuration circuitry 1042 may access a mapping of different RACH configurations to different services (e.g., network slices). The RACH configuration circuitry 1042 may then use the service (e.g., a network slice) identified at block 1102 (e.g., an NSSAI) as an entry into the mapping to identify the RACH configuration to be used to transmit a PRACH for the service.

At block 1106, the UE may conduct a RACH operation for the service according to the first RACH configuration. For example, the RACH processing circuitry 1043 together with the communication and processing circuitry 1041 and the transceiver 1010, shown and described above in connection with FIG. 10, may transmit a PRACH on a resource specified by the first RACH configuration. Alternatively or in addition, the RACH processing circuitry 1043 together with the communication and processing circuitry 1041 and the transceiver 1010 may use at least one RACH parameter specified by the first RACH configuration to transmit a PRACH.

In some examples, the RACH configuration and the RACH operation may include at least one of a 4-step RACH, a 2-step RACH, or a combination thereof.

In some examples, the first RACH configuration specifies at least one of a RACH resource for the RACH operation, a RACH parameter for the RACH operation, or a combination thereof. In some examples, the RACH parameter may include at least one of a preamble ramping step, a backoff scaling factor, or a combination thereof. In some examples, the RACH resource may include at least one of a group of preambles, a RACH occasion (RO), or a combination thereof.

In some examples, the method may further include receiving an indication of the set of RACH configurations from a base station via a radio resource control (RRC) message, a system information block (SIB), or a non-access stratum (NAS) message.

In some examples, the set of RACH configurations specifies the first RACH configuration for a first slice group and a second RACH configuration for a second slice group that is different from the first slice group. In some examples, the first slice group is associated with a first use case and the second slice group is associated with a second use case that is different from the first use case.

In some examples, the first RACH configuration for the first slice group specifies a first RACH resource and the second RACH configuration for the second slice group specifies a second RACH resource that is different from the first RACH resource. In some examples, the first RACH resource is a cell-specific RACH resource and the second RACH resource is a dedicated RACH resource that is different from the cell-specific RACH resource. In some examples, the first RACH configuration for the first slice group specifies a first RACH parameter for a first slice of the first slice group and a second RACH parameter for a second slice of the first slice group.

In some examples, the first RACH configuration for the first slice group specifies a first RACH parameter and the second RACH configuration for the second slice group specifies a second RACH parameter. In some examples, the first RACH configuration for the first slice group specifies a first RACH resource for a first slice of the first slice group and a second RACH resource for a second slice of the first slice group. In some examples, the first RACH resource is a cell-specific RACH resource and the second RACH resource is a dedicated RACH resource that is different from the cell-specific RACH resource.

In some examples, the method may further include determining that the RACH operation is triggered by an invocation of the service at the user equipment or by traffic arriving at the user equipment and providing, via a non-access stratum (NAS) message, information for the service to an access stratum (AS) layer. In some examples, the AS layer selects the first RACH configuration for the service based on the information for the service.

In some examples, the method may further include determining that the RACH operation is not triggered by an invocation of the service at the user equipment or by traffic arriving at the user equipment and providing, via a non-access stratum (NAS) message, network slice selection assistance information (NSSAI) for the service and slice priority information (e.g., indicating at least one priority of at least one slice) to an access stratum (AS) layer. In some examples, the AS layer selects the first RACH configuration for the service based on the NSSAI for the service and the slice priority information. In some examples, the AS layer selects the first RACH configuration for the service based on a highest priority slice associated with the NSSAI. In some examples, the AS layer selects the first RACH configuration for the service based on a lowest priority slice associated with the NSSAI.

In some examples, the method may further include receiving an indication of the set of RACH configurations from a base station via a radio resource control (RRC) message or a system information block (SIB). In some examples, the set of RACH configurations specifies the first RACH configuration for a first slice group and a second RACH configuration for a second slice group that is different from the first slice group. In some examples, the first RACH configuration specifies a first set of RACH parameters for the first slice group. In some examples, the second RACH configuration specifies a second set of RACH parameters for the second slice group. In some examples, the first RACH configuration for the first slice group specifies a first RACH resource for a first slice of the first slice group and a second RACH resource for a second slice of the first slice group. In some examples, the first RACH resource is a cell-specific RACH resource and the second RACH resource is a dedicated RACH resource that is different from the cell-specific RACH resource.

In some examples, the method may further include receiving an indication of the set of RACH configurations from a base station via a radio resource control (RRC) message or a system information block (SIB). In some examples, the set of RACH configurations specifies the first RACH configuration for a first slice group. In some examples, the first RACH configuration specifies a first RACH resource for the first slice group and a second RACH configuration for a second slice group that is different from the first slice group. In some examples, the second RACH configuration specifies a second RACH resource for the second slice group. In some examples, the first RACH resource is a cell-specific RACH resource and the second RACH resource is a dedicated RACH resource that is different from the cell-specific RACH resource. In some examples, the first RACH configuration for the first slice group specifies a cell-specific set of RACH parameters for a first slice of the first slice group and a dedicated set of RACH parameters for a second slice of the first slice group.

In some examples, the set of RACH configurations specifies the first RACH configuration for a first slice group associated with mobile oriented traffic and a second RACH configuration for a second slice group associated with mobile terminated traffic.

In some examples, the method may further include receiving an indication of RACH resources from a base station via a radio resource control (RRC) message or a system information block (SIB). In some examples, the indication of RACH resources specifies a first RACH resource for the first slice group and a second RACH resource for the second slice group. In some examples, the first RACH resource is a cell-specific RACH resource and the second RACH resource is a dedicated RACH resource that is different from the cell-specific RACH resource.

In some examples, the method may further include receiving an indication of RACH parameters from a base station via a radio resource control (RRC) message or a system information block (SIB). In some examples, the indication of RACH parameters specifies a first set of RACH parameters for the first slice group and a second set of RACH parameters for the second slice group. In some examples, the first set of RACH parameters is a cell-specific set of RACH parameters and the second set of RACH parameters is a dedicated set of RACH parameters that is different from the cell-specific set of RACH parameters.

In some examples, the first RACH configuration specifies a RACH resource. In some examples, conducting the RACH operation for the service according to the first RACH configuration may include transmitting a physical random access channel (PRACH) message on the RACH resource.

In some examples, the first RACH configuration specifies at least one RACH parameter. In some examples, conducting the RACH operation for the service according to the first RACH configuration may include using the at least one RACH parameter to transmit a physical random access channel (PRACH) message.

Figure 12:
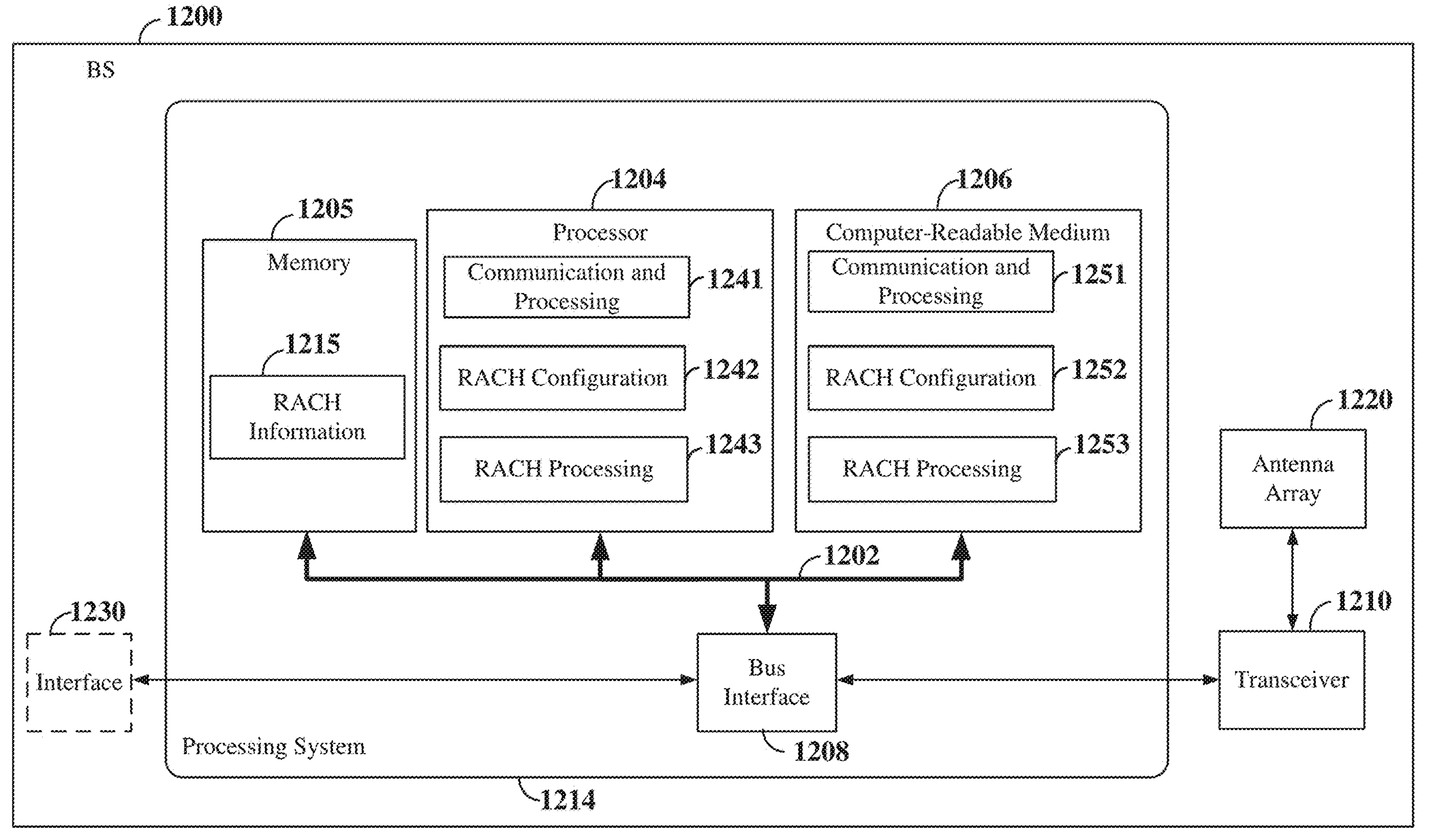
FIG. 12 is a block diagram illustrating an example of a hardware implementation for a base station employing a processing system according to some aspects.

FIG. 12 is a conceptual diagram illustrating an example of a hardware implementation for base station (BS) 1200 employing a processing system 1214. In some implementations, the BS 1200 may correspond to any of the BSs (e.g., gNBs) or scheduling entities shown in any of FIGS. 1, 2, 5, 6, and 9.

In accordance with various aspects of the disclosure, an element, or any portion of an element, or any combination of elements may be implemented with the processing system 1214. The processing system may include one or more processors 1204. The processing system 1214 may be substantially the same as the processing system 1014 illustrated in FIG. 10, including a bus interface 1208, a bus 1202, memory 1205, a processor 1204, and a computer-readable medium 1206. The memory 1205 may store RACH information 1215 (e.g., slice-related parameters) used by the processor 1204 in cooperation with the transceiver 1210 for transmitting and/or receiving RACH messages. Furthermore, the BS 1200 may include an interface 1230 (e.g., a network interface) that provides a means for communicating with at least one other apparatus within a core network and with at least one radio access network.

The BS 1200 may be configured to perform any one or more of the operations described herein (e.g., as described above in conjunction with FIGS. 1-9 and as described below in conjunction with FIGS. 16-17). In some aspects of the disclosure, the processor 1204, as utilized in the BS 1200, may include circuitry configured for various functions.

The processor 1204 may be configured to generate, schedule, and modify a resource assignment or grant of time-frequency resources (e.g., a set of one or more resource elements). For example, the processor 1204 may schedule time-frequency resources within a plurality of time division duplex (TDD) and/or frequency division duplex (FDD) subframes, slots, and/or mini-slots to carry user data traffic and/or control information to and/or from multiple UEs.

The processor 1204 may be configured to schedule resources for the transmission of downlink reference signals (e.g., SSBs or CSI-RSs) on a plurality of downlink beams for a downlink beam sweep in accordance with a selected downlink beam sweep type and selected number of downlink reference signal resources indicated in a request for uplink beam refinement received from a UE. The processor 1204 may further be configured to schedule resources for the uplink transmission of uplink reference signals (e.g., SRSs) on a plurality of uplink beams for an uplink beam sweep in accordance with a selected beam sweep type and selected number of uplink reference signal resources indicated in the request. The processor 1204 may further be configured to schedule resources that may be utilized by the UE to transmit the request. For example, the uplink beam refinement request resources may include resources scheduled for transmission of a PUCCH, PUSCH, PRACH occasion or RRC message. In some examples, the processor 1204 may be configured to schedule PUSCH resources for the uplink beam refinement request in response to receiving a scheduling request from the UE.

The processor 1204 may further be configured to schedule resources for the transmission of an uplink signal. In some examples, the resources may be associated with one or more uplink transmit beams and one or more corresponding receive beams applied to the uplink signal (e.g., based on the uplink BPLs) based on an indication of the uplink signal associated with the one or more uplink transmit beams included in the request. In some examples, the resources may be associated with an uplink transmission scheme indicating a number of uplink transmit beams to be utilized for the uplink signal, a number of repetitions per uplink transmit beam of the uplink signal, and a multiplexing scheme when more than one uplink transmit beam is used to transmit the uplink signal.

In some aspects of the disclosure, the processor 1204 may include communication and processing circuitry 1241. The communication and processing circuitry 1244 may be configured to communicate with a UE. The communication and processing circuitry 1241 may include one or more hardware components that provide the physical structure that performs various processes related to communication (e.g., signal reception and/or signal transmission) as described herein. The communication and processing circuitry 1241 may further include one or more hardware components that provide the physical structure that performs various processes related to signal processing (e.g., processing a received signal and/or processing a signal for transmission) as described herein. The communication and processing circuitry 1241 may further be configured to execute communication and processing software 1251 included on the computer-readable medium 1206 to implement one or more functions described herein.

In some examples, the communication and processing circuitry 1241 may be configured to receive and process uplink beamformed signals at a mmWave frequency or a sub-6 GHz frequency via the transceiver 1210 and an antenna array 1220. For example, the communication and processing circuitry 1241 may be configured to receive a respective reference signal (e.g., SRS or DMRS) on each of a plurality of uplink beams from the UE during an uplink beam sweep.

In some examples, the communication and processing circuitry 1241 may further be configured to generate and transmit downlink beamformed signals at a mmWave frequency or a sub-6 GHz frequency via the transceiver 1210 and the antenna array 1220. For example, the communication and processing circuitry 1241 may be configured to transmit a respective downlink reference signal (e.g., SSB or CSI-RS) on each of a plurality of downlink beams to the UE during a downlink beam sweep via at least one first antenna panel of the antenna array 1220. The communication and processing circuitry 1241 may further be configured to receive a beam measurement report from the UE.

The communication and processing circuitry 1241 may further be configured to receive a request from the UE. For example, the request may be included in a MAC-CE carried in a PUSCH, UCI in a PUCCH or PUSCH, a random access message, or an RRC message. The communication and processing circuitry 1241 may further be configured to receive a scheduling request (e.g., via UCI in a PUCCH) from the UE for an uplink grant for the PUSCH carrying the MAC-CE including the request for uplink beam refinement.

The communication and processing circuitry 1241 may further be configured to receive an uplink signal on one or more uplink receive beams via one or more uplink transmit beams applied to the uplink signal. For example, the communication and processing circuitry 1241 may be configured to receive the uplink signal on one or more uplink receive beams via at least one second antenna panel of the antenna array 1220. The uplink signal may include, for example, a PUCCH, PUSCH, SRS, DMRS, or PRACH.

The communication and processing circuitry 1241 may further be configured to control the antenna array 1220 and transceiver 1210 to generate a plurality of downlink transmit beams during a downlink beam sweep. The communication and processing circuitry 1241 may further be configured to receive a beam measurement report from the UE using the communication and processing circuitry 1244. The communication and processing circuitry 1241 may further be configured to identify one or more selected uplink beam(s) based on the beam measurements. In some examples, the communication and processing circuitry 1241 may be configured to compare the respective RSRP (or other beam measurement) measured on each of the downlink receive beams for each of the serving downlink transmit beams to identify the serving downlink receive beams and to further identify the serving downlink receive beams as the selected uplink transmit beams. Each serving downlink receive beam may have the highest measured RSRP (or other beam measurement) for one of the downlink transmit beams.

The communication and processing circuitry 1241 may be configured to receive one or more uplink transmit beams in an uplink beam sweep. Each uplink transmit beam may carry an uplink reference signal (e.g., an SRS) for measurement by the communication and processing circuitry 1241. The communication and processing circuitry 1241 may further be configured to obtain a plurality of beam measurements on each of a plurality of uplink receive beams of the antenna array 1220 for each of the uplink transmit beams. The communication and processing circuitry 1241 may further be configured to select the selected uplink transmit beam(s) and corresponding uplink receive beams forming respective uplink BPLs based on the uplink beam measurements.

In some implementations wherein the communication involves receiving information, the communication and processing circuitry 1241 may obtain information from a component of the BS 1200 (e.g., from the transceiver 1210 that receives the information via radio frequency signaling or some other type of signaling suitable for the applicable communication medium), process (e.g., decode) the information, and output the processed information. For example, the communication and processing circuitry 1241 may output the information to another component of the processor 1204, to the memory 1205, or to the bus interface 1208. In some examples, the communication and processing circuitry 1241 may receive one or more of signals, messages, other information, or any combination thereof. In some examples, the communication and processing circuitry 1241 may receive information via one or more channels. In some examples, the communication and processing circuitry 1241 may include functionality for a means for receiving. In some examples, the communication and processing circuitry 1241 may include functionality for a means for decoding.

In some implementations wherein the communication involves sending (e.g., transmitting) information, the communication and processing circuitry 1241 may obtain information (e.g., from another component of the processor 1204, the memory 1205, or the bus interface 1208), process (e.g., encode) the information, and output the processed information. For example, the communication and processing circuitry 1241 may output the information to the transceiver 1210 (e.g., that transmits the information via radio frequency signaling or some other type of signaling suitable for the applicable communication medium). In some examples, the communication and processing circuitry 1241 may send one or more of signals, messages, other information, or any combination thereof. In some examples, the communication and processing circuitry 1241 may send information via one or more channels. In some examples, the communication and processing circuitry 1241 may include functionality for a means for sending (e.g., a means for transmitting). In some examples, the communication and processing circuitry 1241 may include functionality for a means for encoding.

The processor 1204 may include RACH configuration circuitry 1242 configured to perform RACH configuration-related operations as discussed herein (e.g., one or more of the operations described in conjunction with FIGS. 7-9). The RACH configuration circuitry 1242 may include functionality for a means for defining a set of RACH configurations (e.g., as described at blocks 702 and 704 of FIG. 7 and/or steps 906 and 916 of FIG. 9 and/or block 1302 of FIG. 13). The RACH configuration circuitry 1242 may include functionality for a means for transmitting an indication of a set of RACH configurations (e.g., as described at block 706 of FIG. 7 and/or steps 908 and 918 of FIG. 9 and/or block 1304 of FIG. 13). The RACH configuration circuitry 1242 may further be configured to execute RACH configuration software 1252 included on the computer-readable medium 1206 to implement one or more functions described herein.

The processor 1204 may include RACH processing circuitry 1243 configured to perform RACH processing-related operations as discussed herein (e.g., one or more of the operations described in conjunction with FIGS. 7-9). The RACH processing circuitry 1243 may include functionality for a means for receiving a RACH message (e.g., as described at block 708 of FIG. 7 and/or steps 914 and 924 of FIG. 9 and/or block 1306 of FIG. 13). The RACH processing circuitry 1243 may further be configured to execute RACH processing software 1253 included on the computer-readable medium 1206 to implement one or more functions described herein.

Figure 13:
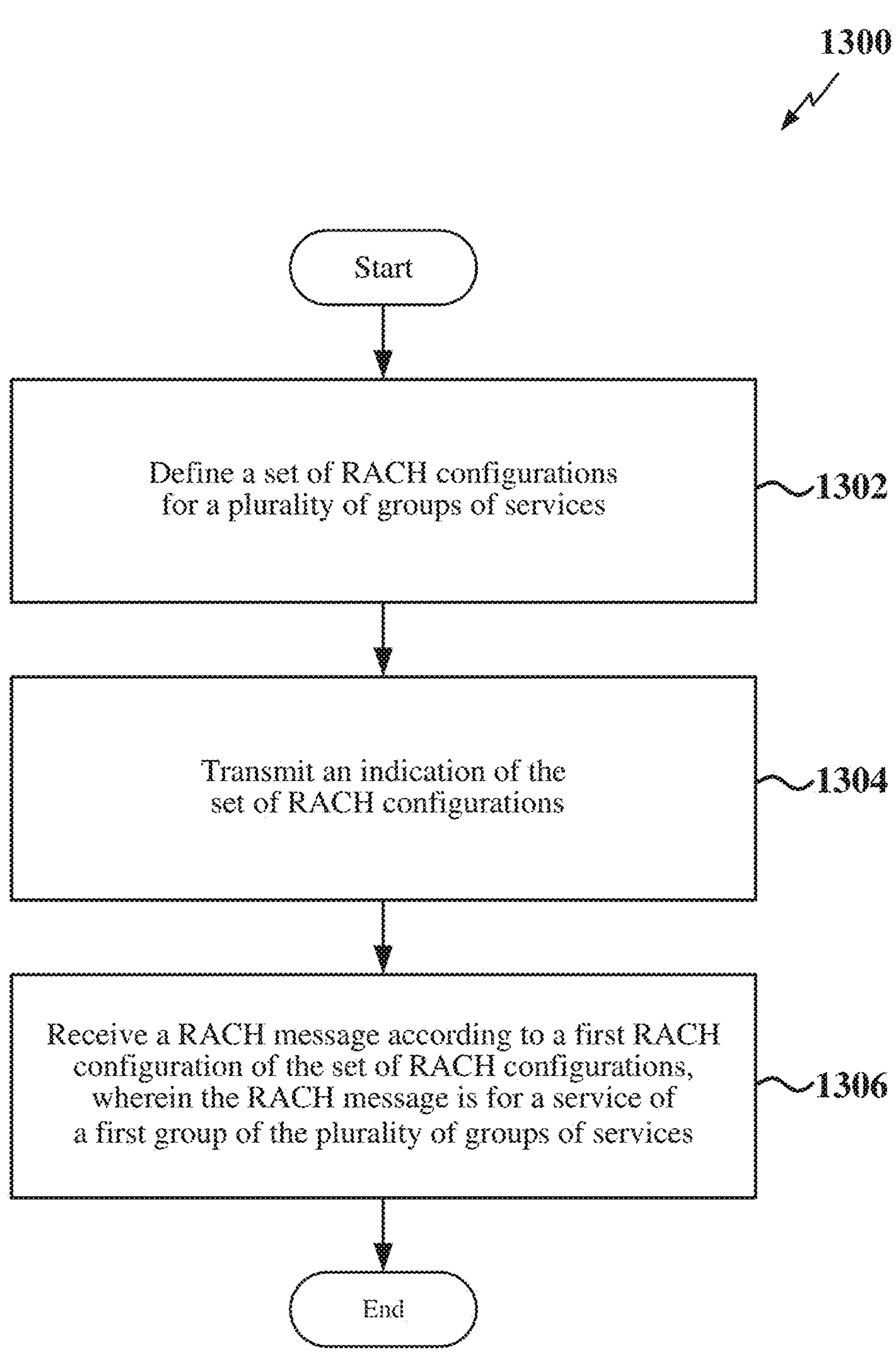
FIG. 13 is a flow chart illustrating an example random access method according to some aspects.

FIG. 13 is a flow chart illustrating an example wireless communication method 1300 according to some aspects of the disclosure. As described herein, some or all illustrated features may be omitted in a particular implementation within the scope of the present disclosure, and some illustrated features may not be required for implementation of all embodiments. In some examples, the method 1300 may be carried out by the BS 1200 illustrated in FIG. 12. In some examples, the method 1300 may be carried out by any suitable apparatus or means for carrying out the functions or algorithm described below.

At block 1302, a BS may define a set of RACH configurations for a plurality of groups of services. For example, the RACH configuration circuitry 1242, shown and described above in connection with FIG. 12, may define different groups of network slices, where each slice group includes at least one network slice. In addition, the RACH configuration circuitry 1242 may specify a RACH configuration for each slice group. In some examples, the RACH configurations may be prioritized whereby the RACH resources and/or parameters specified for one slice group may provide better RACH performance than the RACH resources and/or parameters specified for another slice group. Also, the RACH configuration circuitry 1242 may prioritize the RACH resources and/or parameters specified for different slices within a slice group.

At block 1304, the BS may transmit an indication of the set of RACH configurations. For example, the RACH configuration circuitry 1242 may generate a message that includes a RACH configuration index (that specifies a particular RACH configuration). The RACH configuration circuitry 1242 together with the communication and processing circuitry 1241 and the transceiver 1210, shown and described above in connection with FIG. 12, may then transmit the message on a resource (e.g., a PDCCH) that is monitored by one or more UEs.

At block 1306, the BS may receive a RACH message according to a first RACH configuration of the set of RACH configurations, wherein the RACH message is for a service of a first group of the plurality of groups of services. For example, the RACH processing circuitry 1243 together with the communication and processing circuitry 1241 and the transceiver 1210, shown and described above in connection with FIG. 12, may receive a PRACH on a resource specified by the first RACH configuration. Here, the RACH processing circuitry 1243 may attempt to decode a specified PRACH preamble sequence on one or more specified ROs.

In some examples, the plurality of groups of services may include a plurality of groups of network slices.

In some examples, the first RACH configuration specifies at least one of a RACH resource for the RACH operation, a RACH parameter for the RACH operation, or a combination thereof. In some examples, the RACH parameter may include at least one of a preamble ramping step, a backoff scaling factor, or a combination thereof. In some examples, the RACH resource may include at least one of a group of preambles, a RACH occasion (RO), or a combination thereof.

In some examples, transmitting the indication of the set of RACH configurations may include transmitting the indication of the set of RACH configurations via a radio resource control (RRC) message, a system information block (SIB), or a non-access stratum (NAS) message.

In some examples, the set of RACH configurations specifies the first RACH configuration for a first slice group and a second RACH configuration for a second slice group that is different from the first slice group. In some examples, the first slice group is associated with a first use case and the second slice group is associated with a second use case that is different from the first use case.

In some examples, the first RACH configuration for the first slice group specifies a first RACH resource and the second RACH configuration for the second slice group specifies a second RACH resource that is different from the first RACH resource. In some examples, the first RACH resource is a cell-specific RACH resource and the second RACH resource is a dedicated RACH resource that is different from the cell-specific RACH resource. In some examples, the first RACH configuration for the first slice group specifies a first RACH parameter for a first slice of the first slice group and a second RACH parameter for a second slice of the first slice group.

In some examples, the first RACH configuration for the first slice group specifies a first RACH parameter and the second RACH configuration for the second slice group specifies a second RACH parameter. In some examples, the first RACH configuration for the first slice group specifies a first RACH resource for a first slice of the first slice group and a second RACH resource for a second slice of the first slice group. In some examples, the first RACH resource is a cell-specific RACH resource and the second RACH resource is a dedicated RACH resource that is different from the cell-specific RACH resource.

In some examples, transmitting the indication of the set of RACH configurations may include transmitting the indication of the set of RACH configurations via a radio resource control (RRC) message or a system information block (SIB). In some examples, the set of RACH configurations specifies the first RACH configuration for a first slice group. In some examples, the first RACH configuration specifies a first set of RACH parameters for the first slice group and a second RACH configuration for a second slice group that is different from the first slice group. In some examples, the second RACH configuration specifies a second set of RACH parameters for the second slice group. In some examples, the first RACH configuration for the first slice group specifies a first RACH resource for a first slice of the first slice group and a second RACH resource for a second slice of the first slice group. In some examples, the first RACH resource is a cell-specific RACH resource and the second RACH resource is a dedicated RACH resource that is different from the cell-specific RACH resource.

In some examples, transmitting the indication of the set of RACH configurations may include transmitting the indication of the set of RACH configurations via a radio resource control (RRC) message or a system information block (SIB). In some examples, the set of RACH configurations specifies the first RACH configuration for a first slice group. In some examples, the first RACH configuration specifies a first RACH resource for the first slice group and a second RACH configuration for a second slice group that is different from the first slice group. In some examples, the second RACH configuration specifies a second RACH resource for the second slice group. In some examples, the first RACH resource is a cell-specific RACH resource and the second RACH resource is a dedicated RACH resource that is different from the cell-specific RACH resource. In some examples, the first RACH configuration for the first slice group specifies a cell-specific set of RACH parameters for a first slice of the first slice group and a dedicated set of RACH parameters for a second slice of the first slice group.

Aspect 1: A method for wireless communication at a user equipment, the method comprising: identifying a service; selecting a first random access channel (RACH) configuration for the service from a set of RACH configurations for a plurality of groups of services; and conducting a RACH operation for the service according to the first RACH configuration.

Aspect 2: The method of aspect 1, wherein the plurality of groups of services comprises a plurality of groups of network slices.

Aspect 3: The method of aspect 1 or 2, wherein the first RACH configuration specifies at least one of: a RACH resource for the RACH operation, a RACH parameter for the RACH operation, or a combination thereof.

Aspect 4: The method of aspect 3, wherein the RACH parameter comprises at least one of: a preamble ramping step, a backoff scaling factor, or a combination thereof.

Aspect 5: The method of aspect 5, wherein the RACH resource comprises at least one of: a group of preambles, a RACH occasion (RO), or a combination thereof.

Aspect 6: The method of any of aspects 1 through 5, wherein the RACH configuration and the RACH operation comprises at least one of: a 4-step RACH, a 2-step RACH, or a combination thereof.

Aspect 7: The method of any of aspects 1 through 6, further comprising: receiving an indication of the set of RACH configurations from a base station via a radio resource control (RRC) message, a system information block (SIB), or a non-access stratum (NAS) message.

Aspect 8: The method of any of aspects 1 through 7, wherein the set of RACH configurations specifies: the first RACH configuration for a first slice group; and a second RACH configuration for a second slice group that is different from the first slice group.

Aspect 9: The method of aspect 8, wherein: the first slice group is associated with a first use case; and the second slice group is associated with a second use case that is different from the first use case.

Aspect 10: The method of aspect 8, wherein: the first RACH configuration for the first slice group specifies a first RACH resource; and the second RACH configuration for the second slice group specifies a second RACH resource that is different from the first RACH resource.

Aspect 11: The method of aspect 10, wherein: the first RACH resource is a cell-specific RACH resource; and the second RACH resource is a dedicated RACH resource that is different from the cell-specific RACH resource.

Aspect 12: The method of aspect 10, wherein the first RACH configuration for the first slice group specifies: a first RACH parameter for a first slice of the first slice group; and a second RACH parameter for a second slice of the first slice group.

Aspect 13: The method of aspect 8, wherein: the first RACH configuration for the first slice group specifies a first RACH parameter; and the second RACH configuration for the second slice group specifies a second RACH parameter.

Aspect 14: The method of aspect 13, wherein the first RACH configuration for the first slice group specifies: a first RACH resource for a first slice of the first slice group; and a second RACH resource for a second slice of the first slice group.

Aspect 15: The method of aspect 14, wherein: the first RACH resource is a cell-specific RACH resource; and the second RACH resource is a dedicated RACH resource that is different from the cell-specific RACH resource.

Aspect 16: The method of any of aspects 1 through 15, further comprising: determining that the RACH operation is triggered by an invocation of the service at the user equipment or by traffic arriving at the user equipment; and providing, via a non-access stratum (NAS) message, information for the service to an access stratum (AS) layer; wherein the AS layer selects the first RACH configuration for the service based on the information for the service.

Aspect 17: The method of any of aspects 1 through 16, further comprising: determining that the RACH operation is not triggered by an invocation of the service at the user equipment or by traffic arriving at the user equipment; and providing, via a non-access stratum (NAS) message, network slice selection assistance information (NSSAI) for the service and slice priority information to an access stratum (AS) layer; wherein the AS layer selects the first RACH configuration for the service based on the NSSAI for the service and the slice priority information.

Aspect 18: The method of aspect 17, wherein the AS layer selects the first RACH configuration for the service based on a highest priority slice associated with the NSSAI.

Aspect 19: The method of aspect 17, wherein the AS layer selects the first RACH configuration for the service based on a lowest priority slice associated with the NSSAI.

Aspect 20: The method of any of aspects 1 through 19, further comprising receiving an indication of the set of RACH configurations from a base station via a radio resource control (RRC) message or a system information block (SIB), wherein the set of RACH configurations specifies: the first RACH configuration for a first slice group, wherein the first RACH configuration specifies a first set of RACH parameters for the first slice group; and a second RACH configuration for a second slice group that is different from the first slice group, wherein the second RACH configuration specifies a second set of RACH parameters for the second slice group.

Aspect 21: The method of aspect 20, wherein the first RACH configuration for the first slice group specifies: a first RACH resource for a first slice of the first slice group; and a second RACH resource for a second slice of the first slice group.

Aspect 22: The method of aspect 21, wherein: the first RACH resource is a cell-specific RACH resource; and the second RACH resource is a dedicated RACH resource that is different from the cell-specific RACH resource.

Aspect 23: The method of any of aspects 1 through 22, further comprising receiving an indication of the set of RACH configurations from a base station via a radio resource control (RRC) message or a system information block (SIB), wherein the set of RACH configurations specifies: the first RACH configuration for a first slice group, wherein the first RACH configuration specifies a first RACH resource for the first slice group; and a second RACH configuration for a second slice group that is different from the first slice group, wherein the second RACH configuration specifies a second RACH resource for the second slice group.

Aspect 24: The method of aspect 23, wherein: the first RACH resource is a cell-specific RACH resource; and the second RACH resource is a dedicated RACH resource that is different from the cell-specific RACH resource.

Aspect 25: The method of aspect 23, wherein the first RACH configuration for the first slice group specifies: a cell-specific set of RACH parameters for a first slice of the first slice group; and a dedicated set of RACH parameters for a second slice of the first slice group.

Aspect 26: The method of any of aspects 1 through 25, wherein the set of RACH configurations specifies: the first RACH configuration for a first slice group associated with mobile oriented traffic; and a second RACH configuration for a second slice group associated with mobile terminated traffic.

Aspect 27: The method of aspect 26, further comprising receiving an indication of RACH resources from a base station via a radio resource control (RRC) message or a system information block (SIB), wherein the indication of RACH resources specifies: a first RACH resource for the first slice group; and a second RACH resource for the second slice group.

Aspect 28: The method of aspect 27, wherein: the first RACH resource is a cell-specific RACH resource; and the second RACH resource is a dedicated RACH resource that is different from the cell-specific RACH resource.

Aspect 29: The method of aspect 26, further comprising receiving an indication of RACH parameters from a base station via a radio resource control (RRC) message or a system information block (SIB), wherein the indication of RACH parameters specifies: a first set of RACH parameters for the first slice group; and a second set of RACH parameters for the second slice group.

Aspect 30: The method of aspect 29, wherein: the first set of RACH parameters is a cell-specific set of RACH parameters; and the second set of RACH parameters is a dedicated set of RACH parameters that is different from the cell-specific set of RACH parameters.

Aspect 31: The method of any of aspects 1 through 30, wherein: the first RACH configuration specifies a RACH resource; and conducting the RACH operation for the service according to the first RACH configuration comprises transmitting a physical random access channel (PRACH) message on the RACH resource.

Aspect 32: The method of any of aspects 1 through 31, wherein: the first RACH configuration specifies at least one RACH parameter; and conducting the RACH operation for the service according to the first RACH configuration comprises using the at least one RACH parameter to transmit a physical random access channel (PRACH) message.

Aspect 33: A user equipment (UE) comprising: a transceiver configured to communicate with a radio access network, a memory, and a processor communicatively coupled to the transceiver and the memory, wherein the processor and the memory are configured to perform any one of aspects 1 through 32.

Aspect 34: An apparatus configured for wireless communication comprising at least one means for performing any one of aspects 1 through 32.

Aspect 35: A non-transitory computer-readable medium storing computer-executable code, comprising code for causing an apparatus to perform any one of aspects 1 through 32.

Aspect 36: A method for wireless communication at a base station, the method comprising: defining a set of RACH configurations for a plurality of groups of services; transmitting an indication of the set of RACH configurations; and receiving a RACH message according to a first RACH configuration of the set of RACH configurations, wherein the RACH message is for a service of a first group of the plurality of groups of services.

Aspect 37: The method of aspect 36, wherein the plurality of groups of services comprises a plurality of groups of network slices.

Aspect 38: The method of aspect 36 or 37, wherein the first RACH configuration specifies at least one of: a RACH resource for the RACH operation, a RACH parameter for the RACH operation, or a combination thereof.

Aspect 39: The method of aspect 38, wherein the RACH parameter comprises at least one of: a preamble ramping step, a backoff scaling factor, or a combination thereof.

Aspect 40: The method of any of aspects 36 through 39, wherein transmitting the indication of the set of RACH configurations comprises: transmitting the indication of the set of RACH configurations via a radio resource control (RRC) message, a system information block (SIB), or a non-access stratum (NAS) message.

Aspect 41: The method of any of aspects 36 through 40, wherein the set of RACH configurations specifies: the first RACH configuration for a first slice group; and a second RACH configuration for a second slice group that is different from the first slice group.

Aspect 42: The method of aspect 41, wherein: the first slice group is associated with a first use case; and the second slice group is associated with a second use case that is different from the first use case.

Aspect 43: The method of aspect 41, wherein: the first RACH configuration for the first slice group specifies a first RACH resource; and the second RACH configuration for the second slice group specifies a second RACH resource that is different from the first RACH resource.

Aspect 44: The method of aspect 43, wherein: the first RACH resource is a cell-specific RACH resource; and the second RACH resource is a dedicated RACH resource that is different from the cell-specific RACH resource.

Aspect 45: The method of aspect 43, wherein the first RACH configuration for the first slice group specifies: a first RACH parameter for a first slice of the first slice group; and a second RACH parameter for a second slice of the first slice group.

Aspect 46: The method of aspect 41, wherein: the first RACH configuration for the first slice group specifies a first RACH parameter; and the second RACH configuration for the second slice group specifies a second RACH parameter.

Aspect 47: The method of aspect 46, wherein the first RACH configuration for the first slice group specifies: a first RACH resource for a first slice of the first slice group; and a second RACH resource for a second slice of the first slice group.

Aspect 48: The method of aspect 47, wherein: the first RACH resource is a cell-specific RACH resource; and the second RACH resource is a dedicated RACH resource that is different from the cell-specific RACH resource.

Aspect 49: The method of any of aspects 36 through 48, wherein transmitting the indication of the set of RACH configurations comprises transmitting the indication of the set of RACH configurations via a radio resource control (RRC) message or a system information block (SIB), wherein the set of RACH configurations specifies: the first RACH configuration for a first slice group, wherein the first RACH configuration specifies a first set of RACH parameters for the first slice group; and a second RACH configuration for a second slice group that is different from the first slice group, wherein the second RACH configuration specifies a second set of RACH parameters for the second slice group.

Aspect 50: The method of aspect 49, wherein the first RACH configuration for the first slice group specifies: a first RACH resource for a first slice of the first slice group; and a second RACH resource for a second slice of the first slice group.

Aspect 51: The method of aspect 50, wherein: the first RACH resource is a cell-specific RACH resource; and the second RACH resource is a dedicated RACH resource that is different from the cell-specific RACH resource.

Aspect 52: The method of any of aspects 36 through 15, wherein transmitting the indication of the set of RACH configurations comprises transmitting the indication of the set of RACH configurations via a radio resource control (RRC) message or a system information block (SIB), wherein the set of RACH configurations specifies: the first RACH configuration for a first slice group, wherein the first RACH configuration specifies a first RACH resource for the first slice group; and a second RACH configuration for a second slice group that is different from the first slice group, wherein the second RACH configuration specifies a second RACH resource for the second slice group.

Aspect 53: The method of aspect 52, wherein: the first RACH resource is a cell-specific RACH resource; and the second RACH resource is a dedicated RACH resource that is different from the cell-specific RACH resource.

Aspect 54: The method of aspect 52, wherein the first RACH configuration for the first slice group specifies: a cell-specific set of RACH parameters for a first slice of the first slice group; and a dedicated set of RACH parameters for a second slice of the first slice group.

Aspect 55: A base station (BS) comprising: a transceiver configured to communicate with a UE, a memory, and a processor communicatively coupled to the transceiver and the memory, wherein the processor and the memory are configured to perform any one of aspects 36 through 54.

Aspect 56: An apparatus configured for wireless communication comprising at least one means for performing any one of aspects 36 through 54.

Aspect 57: A non-transitory computer-readable medium storing computer-executable code, comprising code for causing an apparatus to perform any one of aspects 36 through 54.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word “exemplary” is used to mean “serving as an example, instance, or illustration.” Any implementation or aspect described herein as “exemplary” is not necessarily to be construed as preferred or advantageous over other aspects of the disclosure. Likewise, the term “aspects” does not require that all aspects of the disclosure include the discussed feature, advantage or mode of operation. The term “coupled” is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms “circuit” and “circuitry” are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term “determining” may encompass a wide variety of actions. For example, “determining” may include calculating, computing, processing, deriving, investigating, looking up (e.g., looking up in a table, a database or another data structure), ascertaining, resolving, selecting, choosing, establishing, receiving (e.g., receiving information), accessing (e.g., accessing data in a memory), and the like.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean “one and only one” unless specifically so stated, but rather “one or more.” Unless specifically stated otherwise, the term “some” refers to one or more. A phrase referring to “at least one of” a list of items refers to any combination of those items, including single members. As an example, “at least one of: a, b, or c”

is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment, the method comprising:

receiving a set of random access channel (RACH) configurations for a plurality of groups of services, the set of RACH configurations for the plurality of groups of services comprising a first RACH configuration for a first slice group and a second RACH configuration for a second slice group different from the first slice group, the first RACH configuration for the first slice group specifying:

a first set of RACH parameters to be used with the first slice group, a first dedicated RACH resource to be used with at least one first slice of the first slice group, and a first cell-specific RACH resource to be used with at least one second slice of the first slice group, the at least one second slice comprising all slices of the first slice group other than the at least one first slice, wherein the first cell-specific RACH resource is specified for a first serving cell for the user equipment, and the second RACH configuration for the second slice group specifying:

a second set of RACH parameters, different from the first set of RACH parameters, to be used with the second slice group, a second dedicated RACH resource, different from the first dedicated RACH resource, to be used with at least one third slice of the second slice group, and a second cell-specific RACH resource, different from the first cell-specific RACH resource, to be used with at least one fourth slice of the second slice group, the at least one fourth slice comprising all slices of the second slice group other than the at least one third slice, wherein the second cell-specific RACH resource is specified for the first serving cell for the user equipment;

identifying a service;

selecting the first RACH configuration for the service from the set of RACH configurations for the plurality of groups of services; and conducting a RACH operation for the service according to the first RACH configuration.

2. A user equipment, comprising:

one or more memories that store processor-executable code; and one or more processors configured to execute the processor-executable code and cause the user equipment to:

receive a set of random access channel (RACH) configurations for a plurality of groups of services, the set of RACH configurations for the plurality of groups of services comprising a first RACH configuration for a first slice group and a second RACH configuration for a second slice group different from the first slice group, the first RACH configuration for the first slice group specifying:

a first set of RACH parameters to be used with the first slice group, a first dedicated RACH resource to be used with at least one first slice of the first slice group, and a first cell-specific RACH resource to be used with at least one second slice of the first slice group, the at least one second slice comprising all slices of the first slice group other than the at least one first slice, wherein the first cell-specific RACH resource is specified for a first serving cell for the user equipment, and the second RACH configuration for the second slice group specifying:

a second set of RACH parameters, different from the first set of RACH parameters, to be used with the second slice group, a second dedicated RACH resource, different from the first dedicated RACH resource, to be used with at least one third slice of the second slice group, and a second cell-specific RACH resource, different from the first cell-specific RACH resource, to be used with at least one fourth slice of the second slice group, the at least one fourth slice comprising all slices of the second slice group other than the at least one third slice, wherein the second cell-specific RACH resource is specified for the first serving cell for the user equipment;

identify a service;

select the first RACH configuration for the service from the set of RACH configurations for the plurality of groups of services; and conduct a RACH operation for the service according to the first RACH configuration.

3. The user equipment of claim 2, wherein the plurality of groups of services comprises a plurality of groups of network slices.

4. The user equipment of claim 2, wherein the first set of RACH parameters comprises at least one of: a preamble ramping step, a backoff scaling factor, or a combination thereof.

5. The user equipment of claim 4, wherein the first dedicated RACH resource comprises at least one of: a group of preambles, a RACH occasion (RO), or a combination thereof.

6. The user equipment of claim 2, wherein the first RACH configuration and the RACH operation comprise at least one of: a 4-step RACH, a 2-step RACH, or a combination thereof.

7. The user equipment of claim 2, wherein the one or more processors are further configured to execute the processor-executable code and cause the user equipment to:

receive the set of RACH configurations from a network entity via a radio resource control (RRC) message, a system information block (SIB), or a non-access stratum (NAS) message.

8. The user equipment of claim 2, wherein:

the first slice group is defined for a first use case consisting of one of: an industrial traffic use case, a mission critical traffic use case, a low latency traffic use case, a high throughput traffic use case, a sensor traffic use case, a best effort use case, or a medical use case; and the second slice group is defined for a second use case, different from the first use case, consisting of one of:

the industrial traffic use case, the mission critical traffic use case, the low latency traffic use case, the high throughput traffic use case, the sensor traffic use case, the best effort use case, or the medical use case.

9. The user equipment of claim 2, wherein:

the first RACH configuration for the first slice group specifies a first RACH resource; and the second RACH configuration for the second slice group specifies a second RACH resource that is different from the first RACH resource.

10. The user equipment of claim 9, wherein:

the first RACH resource is a cell-specific RACH resource; and the second RACH resource is a dedicated RACH resource that is different from the cell-specific RACH resource.

11. The user equipment of claim 9, wherein the first RACH configuration for the first slice group specifies:

a first RACH parameter for the at least one first slice of the first slice group; and a second RACH parameter for the at least one second slice of the first slice group.

12. The user equipment of claim 2, wherein:

the first RACH configuration for the first slice group specifies a first RACH parameter; and the second RACH configuration for the second slice group specifies a second RACH parameter.

13. The user equipment of claim 2, wherein the one or more processors are further configured to execute the processor-executable code and cause the user equipment to:

determine that the RACH operation is triggered by an invocation of the service at the user equipment or by traffic arriving at the user equipment; and provide, via a non-access stratum (NAS) message, information for the service to an access stratum (AS) layer;

wherein the AS layer selects the first RACH configuration for the service based on the information for the service.

14. The user equipment of claim 2, wherein the one or more processors are further configured to execute the processor-executable code and cause the user equipment to:

determine that the RACH operation is not triggered by an invocation of the service at the user equipment or by traffic arriving at the user equipment; and provide, via a non-access stratum (NAS) message, network slice selection assistance information (NSSAI) for the service and slice priority information to an access stratum (AS) layer;

wherein the AS layer selects the first RACH configuration for the service based on the NSSAI for the service and the slice priority information.

15. The user equipment of claim 14, wherein the AS layer selects the first RACH configuration for the service based on a highest priority slice associated with the NSSAI.

16. The user equipment of claim 14, wherein the AS layer selects the first RACH configuration for the service based on a lowest priority slice associated with the NSSAI.

17. The user equipment of claim 2, wherein the set of RACH configurations specifies that:

the first slice group is a mobile oriented traffic specific slice group; and the second slice group is a mobile terminated traffic specific slice group.

18. The user equipment of claim 2, wherein:

the first RACH configuration further specifies that the first set of RACH parameters comprises a first subset of RACH parameters to be used with the at least one first slice;

the first subset of RACH parameters is associated with a first priority;

the first RACH configuration further specifies that the first set of RACH parameters comprises a second subset of RACH parameters, different from the first subset of RACH parameters, to be used with the at least one second slice; and the second subset of RACH parameters is associated with a second priority that is lower than the first priority.

19. A method for wireless communication at a network entity, the method comprising:

defining a set of random access channel (RACH) configurations for a plurality of groups of services, the set of RACH configurations for the plurality of groups of services comprising a first RACH configuration for a first slice group and a second RACH configuration for a second slice group different from the first slice group, the first RACH configuration for the first slice group specifying:

a first set of RACH parameters to be used with the first slice group, a first dedicated RACH resource to be used with at least one first slice of the first slice group, and a first cell-specific RACH resource to be used with at least one second slice of the first slice group, the at least one second slice comprising all slices of the first slice group other than the at least one first slice, wherein the first cell-specific RACH resource is specified for a first serving cell of the network entity, and the second RACH configuration for the second slice group specifying:

a second set of RACH parameters, different from the first set of RACH parameters, to be used with the second slice group, a second dedicated RACH resource, different from the first dedicated RACH resource, to be used with at least one third slice of the second slice group, and a second cell-specific RACH resource, different from the first cell-specific RACH resource, to be used with at least one fourth slice of the second slice group, the at least one fourth slice comprising all slices of the second slice group other than the at least one third slice, wherein the second cell-specific RACH resource is specified for the first serving cell of the network entity;

transmitting an indication of the set of RACH configurations; and receiving a RACH message according to the first RACH configuration of the set of RACH configurations, wherein the RACH message is for a service of a first group of the plurality of groups of services.

20. A network entity, comprising:

one or more memories that store processor-executable code; and one or more processors configured to execute the processor-executable code and cause the network entity to:

define a set of random access channel (RACH) configurations for a plurality of groups of services, the set of RACH configurations for the plurality of groups of services comprising a first RACH configuration for a first slice group and a second RACH configuration for a second slice group different from the first slice group, the first RACH configuration for the first slice group specifying:

a first set of RACH parameters to be used with the first slice group, a first dedicated RACH resource to be used with at least one first slice of the first slice group, and a first cell-specific RACH resource to be used with at least one second slice of the first slice group, the at least one second slice comprising all slices of the first slice group other than the at least one first slice, wherein the first cell-specific RACH resource is specified for a first serving cell of the network entity, and the second RACH configuration for the second slice group specifying:

a second set of RACH parameters, different from the first set of RACH parameters, to be used with the second slice group, a second dedicated RACH resource, different from the first dedicated RACH resource, to be used with at least one third slice of the second slice group, and a second cell-specific RACH resource, different from the first cell-specific RACH resource, to be used with at least one fourth slice of the second slice group, the at least one fourth slice comprising all slices of the second slice group other than the at least one third slice, wherein the second cell-specific RACH resource is specified for the first serving cell of the network entity;

transmit an indication of the set of RACH configurations; and receive a RACH message according to the first RACH configuration of the set of RACH configurations, wherein the RACH message is for a service of a first group of the plurality of groups of services.

21. The network entity of claim 20, wherein the plurality of groups of services comprises a plurality of groups of network slices.

22. The network entity of claim 20, wherein:

the first slice group is defined for a first use case consisting of one of: an industrial traffic use case, a mission critical traffic use case, a low latency traffic use case, a high throughput traffic use case, a sensor traffic use case, a best effort use case, or a medical use case; and the second slice group is defined for a second use case, different from the first use case, consisting of one of: the industrial traffic use case, the mission critical traffic use case, the low latency traffic use case, the high throughput traffic use case, the sensor traffic use case, the best effort use case, or the medical use case.

23. The network entity of claim 20, wherein:

the first RACH configuration further specifies that the first set of RACH parameters comprises a first subset of RACH parameters to be used with the at least one first slice;

the first subset of RACH parameters is associated with a first priority;

the first RACH configuration further specifies that the first set of RACH parameters comprises a second subset of RACH parameters, different from the first subset of RACH parameters, to be used with the at least one second slice; and the second subset of RACH parameters is associated with a second priority that is lower than the first priority.

* * * * *